United States Patent
Kauffmann et al.

(10) Patent No.: US 9,959,677 B2
(45) Date of Patent: May 1, 2018

(54) MULTIDIMENSIONAL GRAPHICAL METHOD FOR ENTERING AND EXITING APPLICATIONS AND ACTIVITIES IN IMMERSIVE MEDIA

(71) Applicant: GOOGLE INC., Mountain View, CA (US)

(72) Inventors: Alejandro José Kauffmann, San Francisco, CA (US); Jon Michael Wiley, San Jose, CA (US); Manuel Christian Clement, Felton, CA (US)

(73) Assignee: Google LLC, Mountain View, CA (US)

( * ) Notice: Subject to any disclaimer, the term of this patent is extended or adjusted under 35 U.S.C. 154(b) by 199 days.

(21) Appl. No.: 14/721,477

(22) Filed: May 26, 2015

(65) Prior Publication Data

US 2016/0350972 A1 Dec. 1, 2016

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G06F 3/017* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 9,480,907 B2* | 11/2016 | Benko | ............... | A63F 13/00 |
| 9,509,981 B2* | 11/2016 | Wilson | ............... | G06F 3/011 |
| 2007/0150864 A1* | 6/2007 | Goh | ............... | G06F 3/0481 717/113 |
| 2010/0037152 A1* | 2/2010 | Bates | ............... | G06F 3/04815 715/757 |
| 2012/0108332 A1* | 5/2012 | Baseley | ............... | A63F 13/42 463/31 |
| 2012/0320080 A1* | 12/2012 | Giese | ............... | G06F 3/017 345/619 |
| 2013/0135353 A1 | 5/2013 | Wheeler et al. | | |
| 2014/0040826 A1* | 2/2014 | Wei | ............... | G06F 3/0488 715/810 |
| 2014/0372957 A1* | 12/2014 | Keane | ............... | G06F 3/013 715/852 |

(Continued)

FOREIGN PATENT DOCUMENTS

WO 2016/191362 A1 12/2016

OTHER PUBLICATIONS

"Immersive Media Experiences 2013", ACM International Workshop at ACM Multimedia 2013, Oct. 22, 2013, Barcelona, Spain, Mar. 17, 2015, http://immersiveme2013.di.fc.ul.pt, 2 pages.

(Continued)

*Primary Examiner* — Yu Chen
(74) *Attorney, Agent, or Firm* — Brake Hughes Bellermann LLP

(57) ABSTRACT

In one general aspect, a method can include executing, by a computing device, a virtual reality (VR) application, providing, by the computing device, content for display on a screen of a VR headset in a VR space, the content including at least one object being associated with an action, detecting a first movement of a user immersed in the VR space towards the at least one object included in the VR space, and performing the associated action in the VR space based on detecting the first movement.

27 Claims, 18 Drawing Sheets

(56) References Cited

U.S. PATENT DOCUMENTS

2015/0138081 A1     5/2015  Iwatsu et al.
2016/0162157 A1*    6/2016  Liang .................. G06F 3/04817
                                                    715/765
2016/0350973 A1*   12/2016  Shapira ................ G06T 19/006

OTHER PUBLICATIONS

International Search Report and Written Opinion received for PCT Patent Application No. PCT/US2016/033765, dated Jul. 29, 2016, 13 pages.

\* cited by examiner

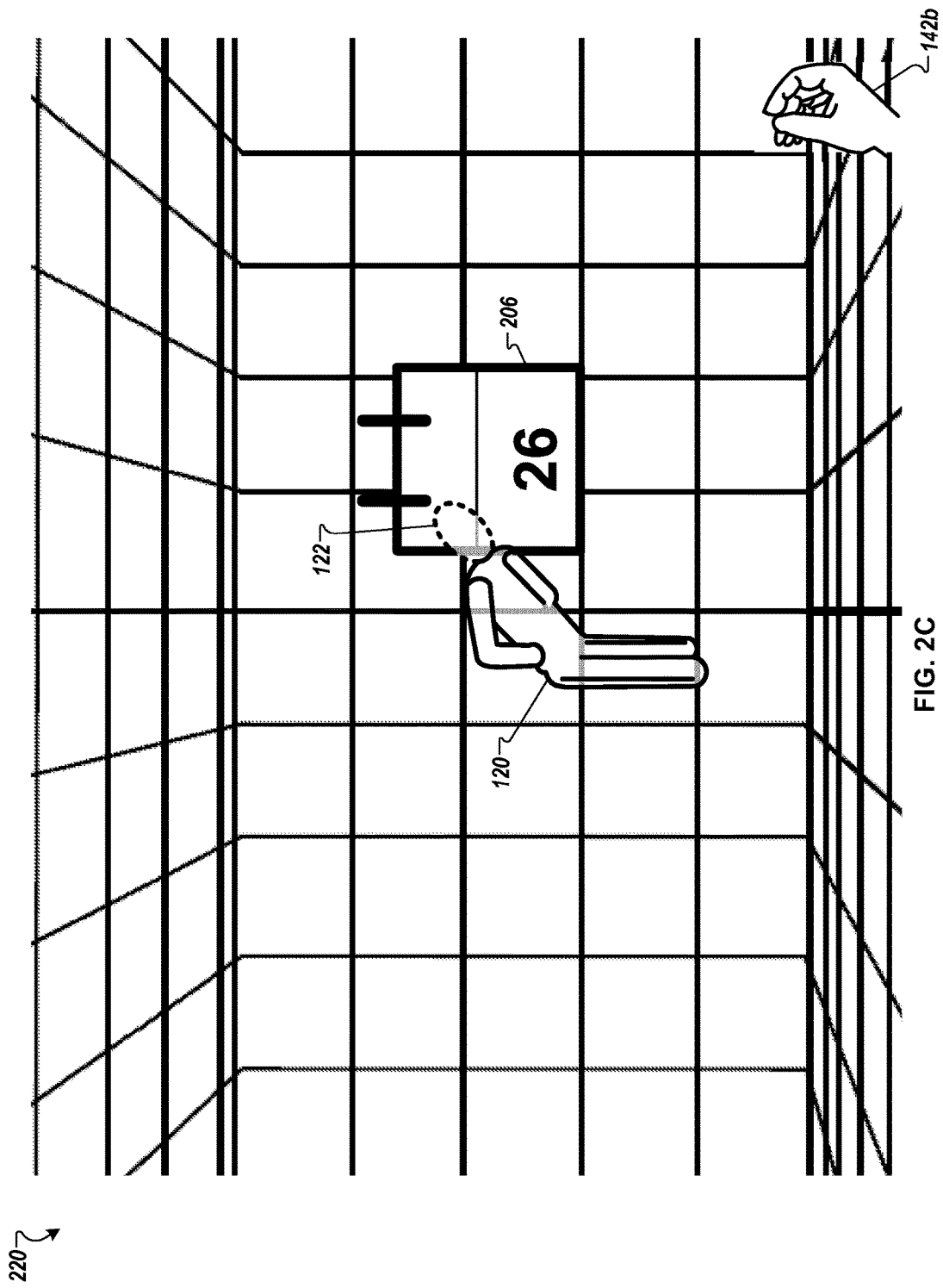

MULTIDIMENSIONAL GRAPHICAL METHOD FOR ENTERING AND EXITING APPLICATIONS AND ACTIVITIES IN IMMERSIVE MEDIA

TECHNICAL FIELD

This description generally relates to user interfaces in virtual reality (VR) space.

BACKGROUND

In general, virtual reality can surround and immerse a person in a computer-generated, three-dimensional (3D) environment. The person can enter this environment by interacting with and/or physically wearing specific electronic devices. Example electronic devices can include, but are not limited to, a helmet that includes a screen, glasses or goggles that a user looks through when viewing a screen (e.g., a display device or monitor), gloves fitted with sensors, and external handheld devices that include sensors. Once the person enters the VR space, the person can interact with the 3D environment in a way (e.g., a physical way) that seems real to the person. The interaction can provide opportunities for immersion, user participation and personalization.

SUMMARY

In one general aspect, a method can include executing, by a computing device, a virtual reality (VR) application, providing, by the computing device, content for display on a screen of a VR headset in a VR space, the content including at least one object being associated with an action, detecting a first movement of a user immersed in the VR space towards the at least one object included in the VR space, and performing the associated action in the VR space based on detecting the first movement.

Example implementations may include one or more of the following features. For instance, the detected first movement can result in the user sharing an amount of space with the at least one object in the VR space. The action can be the execution of an application. The execution of the application can change the content for display on the screen of the VR headset in the VR space. The method can further include detecting a second movement of the user immersed in the VR space away from the at least one object, the detecting occurring subsequent to detecting the first movement of the user immersed in the VR space towards the at least one object. The method can further include stopping the performing of the associated action in the VR space based on detecting the second movement. The detected first movement can result in the user sharing an amount of space with the at least one object in the VR space. The detected second movement can result in the user not sharing the amount of space with the at least one object in the VR space. The detected first movement can result in the user sharing a first amount of space with the at least one object in the VR space. The method can further include detecting a second movement of the user immersed in the VR space further towards the at least one object included in the VR space, the second movement resulting in the user sharing a second amount of space with the at least one object in the VR space, the second amount of space being larger than the first amount of space. The method can further include continuing to perform the associated action in the VR space based on detecting the second movement. The method can further include rendering the first movement in the VR space as a leaning into the at least one object by the user. The method can further include rendering the second movement in the VR space as a leaning further into the at least one object by the user. Continuing to perform the associated action in the VR space can include transporting the user to a different VR space. The method can further include receiving an indication of an interaction by the user with an object included in the different VR space. The method can further include transporting the user back to the VR space based on the received indication of the interaction. The at least one object can be an icon that appears suspended in the VR space. The icon can be transparent. The at least one object can be included in a plurality of objects included in the VR space.

In another general aspect, a non-transitory, machine-readable medium having instructions stored thereon that when executed by a processor can cause a computing device to execute a virtual reality (VR) application, provide content for display on a screen of a VR headset in a VR space, the content including at least one object being associated with an action, detect a first movement of a user immersed in the VR space towards the at least one object included in the VR space, and perform the associated action in the VR space based on detecting the first movement.

Example implementations may include one or more of the following features. For instance, the detected first movement can result in the user sharing an amount of space with the at least one object in the VR space. The computing device can be included in the VR headset. The action can be the execution of an application that changes the content for display on the screen of the VR headset in the VR space. The instructions, when executed by the processor, can further cause the computing device to detect a second movement of the user immersed in the VR space away from the at least one object, the detecting occurring subsequent to detecting the first movement of the user immersed in the VR space towards the at least one object. The instructions, when executed by the processor, can further cause the computing device to stop the performing of the associated action in the VR space based on detecting the second movement. The detected first movement can result in the user sharing an amount of space with the at least one object in the VR space. The detected second movement can result in the user not sharing the amount of space with the at least one object in the VR space. The detected first movement can result in the user sharing a first amount of space with the at least one object in the VR space. The instructions, when executed by the processor, can further cause the computing device to detect a second movement of the user immersed in the VR space further towards the at least one object included in the VR space, the second movement resulting in the user sharing a second amount of space with the at least one object in the VR space, the second amount of space being larger than the first amount of space. The instructions, when executed by the processor, can further cause the computing device to continue to perform the associated action in the VR space based on detecting the second movement. The instructions, when executed by the processor, can further cause the computing device to render the first movement in the VR space as a leaning into the at least one object by the user. The instructions, when executed by the processor, can further cause the computing device to render the second movement in the VR space as a leaning further into the at least one object by the user. Continuing to perform the associated action in the VR space can include transporting the user to a different VR space. The instructions, when executed by the processor, can further cause the computing device to receive an indication of an interaction by the user with an object included in the different VR space. The instructions, when executed by the processor, can further cause the computing device to transport the user back to the VR space based on the received indication of the interaction. The at least one object can be an icon that appears suspended in the VR space.

In yet another general aspect, a system can include a first computing device, a virtual reality (VR) headset operatively coupled to the first computing device, the VR headset including a second computing device and a screen. The VR headset can be configured to detect, by the second computing device, a first movement of a user immersed in the VR space towards an object associated with an action and included in a VR space, and provide an indication of the first movement of the user towards the object to the first computing device. The first computing device can be configured to execute a virtual reality (VR) application, provide content for display on the screen of the VR headset in a VR space, the content including the object, receive the indication of the first movement of the user immersed in the VR space towards the object, and perform the associated action in the VR space based on receiving the indication of the first movement.

Example implementations may include one or more of the following features. For instance, the detected first movement can result in the user sharing an amount of space with the object in the VR space. The first computing device and the second computing device can be the same computing device being included in the VR headset.

The details of one or more implementations are set forth in the accompanying drawings and the description below. Other features will be apparent from the description and drawings, and from the claims.

BRIEF DESCRIPTION OF THE DRAWINGS

FIG. 2C is a diagram that shows a third-person view of a VR space when a movement of a user is rendered/interpreted as leaning (diving, delving, plunging or digging) into an icon.

Like reference symbols in the various drawings indicate like elements.

DETAILED DESCRIPTION

Figure 1A:
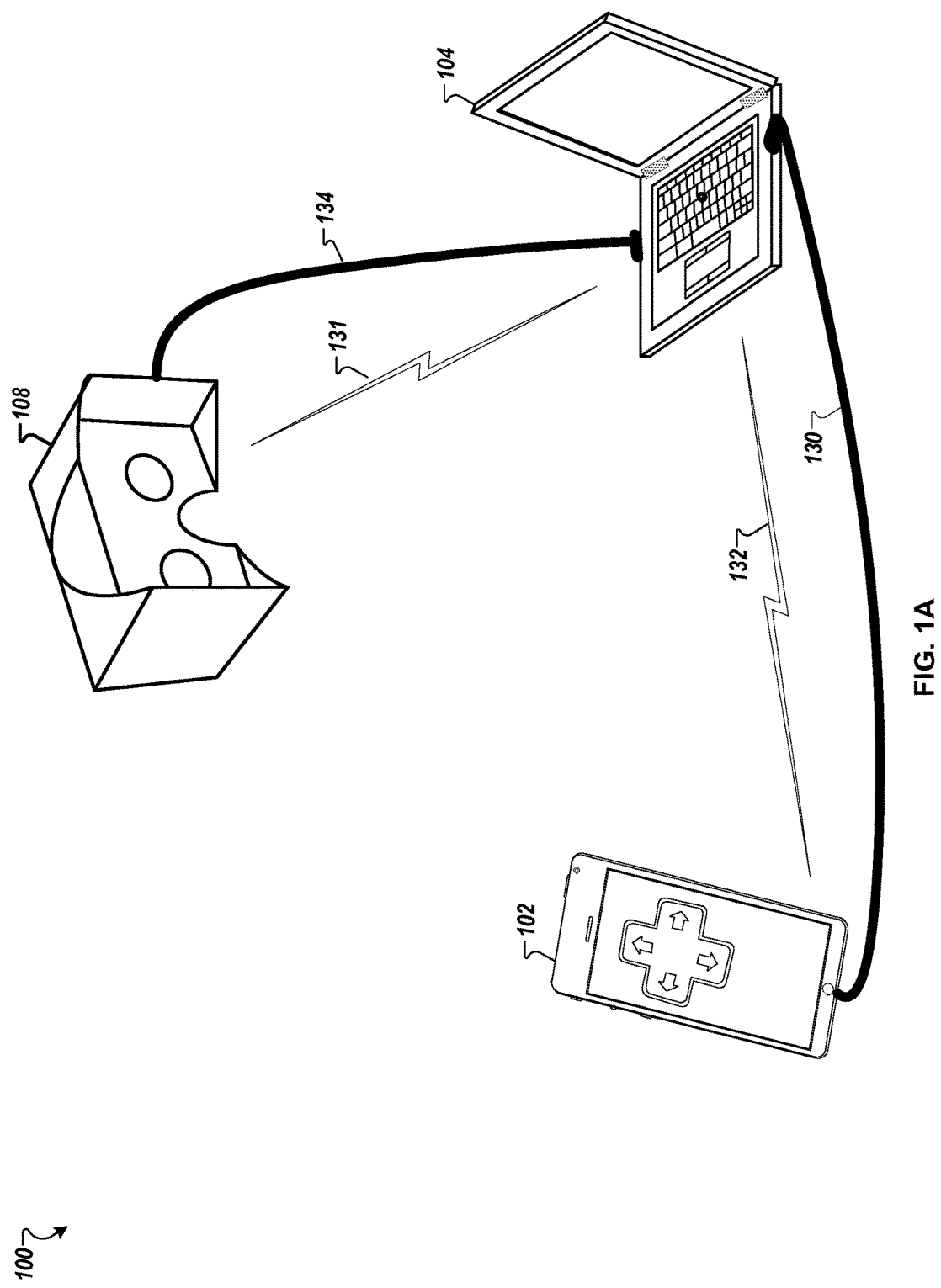
FIG. 1A is a diagram that illustrates an example system for creating and interacting with a computer-generated, 3D environment (a VR space).

A user can be immersed in a three-dimensional (3D), computer generated environment (a virtual reality (VR) space). The user can explore the 3D environment and can interact with the 3D environment. The user can experience a type of immersion media without edges or boundaries. This is in contrast to movement within (interaction with) a two-dimensional (2D) bounded environment (a windowed computing environment). For example, in a 2D bounded environment, a user can interact with a graphical user interface (GUI) presented on a display of a computing device in order to enter or exit (start or end) an application, activity or state in a windowed computing environment. The GUI can provide interactive controls (e.g., buttons, sliders, etc.) that a user can select. On selection, an application or activity, can start, end, or otherwise change state. For example, a user can use a mouse or other type of input device (e.g., a touchscreen, trackpad, etc.) to position a cursor displayed on the display of the computing device over a control. The user can perform some type of tap, click or other selection activity that will launch an application or activity associated with the selection of the control. The application or activity can use the full area of the display device.

In some implementations, in a 3D virtual reality environment, a user may switch between activities and applications by placing each in a distinct physical space within the VR space. For example, the physical space may be a VR room and a user may place each application or activity in its own VR room. The user can navigate to (enter) a particular VR room to launch or start the application or activity that was placed in that room. In some implementations, a user may physically manipulate an abstract representation of an application or activity (e.g., an image or icon) in the VR space. The abstract representation may be floating or suspended in the VR space. The manipulation can be a rotation, touching, or poking at the abstract representation.

In some implementations, while a user is immersed in a VR space, the user can pull up, call up, or bring into view a menu of available activities, applications, or states that the user can transition into or change into within the VR space. In addition or in the alternative, the user can move into objects (icons) included in the VR space in varying amounts. The objects or icons can represent available activities, applications, or states that the user can transition into or change into within the VR space. The amount of immersion into another or alternate VR space represented by the object can be related to the amount of movement of the user into the object (the amount of the object also occupied by the user). For example, in a first VR space if a user merely breaks the surface of an object (the user is slightly immersed into the object, the user is peeking into the object, the user is occupying small portion of the object), the user may remain in the first VR space while peeking into a second VR space represented by the object. When this occurs, for example, the first VR space can change by including additional information about the second VR space. At this point, the user can peek out of the second VR space, in effect backing out of the object and no longer occupying any portion of the object, to fully return to the first VR space, no longer being immersed in the object. Further immersion of the user into the object beyond merely breaking the surface of the object or peeking into the object (the user occupying a larger portion of the object) can result in the user exiting or leaving the first VR space and transitioning into a second VR space represented by the object. In order to return to the first VR space, the user may have to lean into or become immersed in an object or icon that is present in the second VR space and that represents the first VR space.

For example, a user may write computer code in a VR environment or a first VR space. Blocks of source code can be encapsulated as individual objects in the first VR space. A user can navigate the first VR space to interact with a first object that represents a first block of source code. The user can navigate towards the first object, break the surface of the first object (be slightly immersed into the first object, peek into the first object, occupy a small portion of the first object), and remain in the first VR space while peeking into a second VR space that shows the instructions included in the first block of source code. When this occurs, for example, the first VR space can change by including the instructions included in the first block of source code in the first VR space (e.g., floating the source code in a window in the first VR space). Further immersion of the user into the first object beyond merely breaking the surface of the first object or peeking into the object (the user occupying a larger portion of the object) can result in the user being immersed into one or more additional VR spaces that can provide views of the dependencies of the source code, the internal variables used by the source code, the machine-code compilation of the source code and operations on memory performed by the executing of the source code.

In another example, a user can go on a virtual tour of a building or other physical structure such as a museum. The user, being immersed in a first VR space, can explore the VR space as if it were a physical space, for example, moving through and between rooms in the museum, moving into and out of objects included within the museum (e.g., sculptures, paintings, etc.) in varying degrees. Once in a room, a user can approach a piece of art (e.g., a painting, a sculpture) and "dip into" (peek into, lean into, occupy a small amount of space with) the art piece. By dipping into the art piece a first amount, the user can obtain information about the art piece (e.g., the artist, time when it was completed, the owner or donor of the art piece, etc.) that can be shown in the first VR space (e.g., floating on a screen in the VR space). By dipping into the art piece further (an amount greater that the first amount), the user can obtain additional (more detailed) information about aspects of the art piece. For example, the user could obtain information about other art pieces by the artist, other similar pieces of art completed around the same time as the art piece, and/or other art pieces owned by the same owner of this art piece. In reverse, the user can back out of the art piece, returning to the museum floor to explore more of the art works. Complete immersion into the art piece (the user occupies the same amount of space as the art piece) can transport the user to a second VR space that includes, for example, other works of art by the artist.

FIG. 1A is a diagram that illustrates an example system 100 for creating and interacting with a computer-generated, 3D environment (a VR space). In the example system 100, a VR application can execute on a first computing device 102 and/or on a second computing device 104. The second computing device 104 may be a laptop computer, a desktop computer, a mobile computing device, or a gaming console. A VR headset 108 can be connected to the second computing device 104. The second computing device 104 can be connected to the first computing device 102. The first computing device 102 may be used as a controller and/or interface device in a VR space. The second computing device 104 can provide content to the VR headset for the VR space.

In some implementations, the second computing device 104 can be connected to/interfaced with the first computing device 102 using a wired connection 130. In some implementations, the second computing device 104 can be connected to/interfaced with the first computing device 102 using a wireless connection 132. In some implementations, the second computing device 104 can be connected to/interfaced with the VR headset 108 using a wired connection 134. In some implementations, the second computing device 104 can be connected to/interfaced with the VR headset 108 using a wireless connection 131.

The wired connection 130 can include a cable with an appropriate connector on either end for plugging into the first computing device 102 and the second computing device 104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the wired connection 134 can include a cable with an appropriate connector on either end for plugging into the VR headset 138 and the second computing device 104. For example, the cable can include a Universal Serial Bus (USB) connector on both ends. The USB connectors can be the same USB type connector or the USB connectors can each be a different type of USB connector.

The first computing device 102 and/or the VR headset 108 can wirelessly connect to/interface with the second computing device 104 using one or more of the high-speed wireless communication protocols as WiFi, Bluetooth, or Bluetooth Low Energy (LE).

Figure 1B:
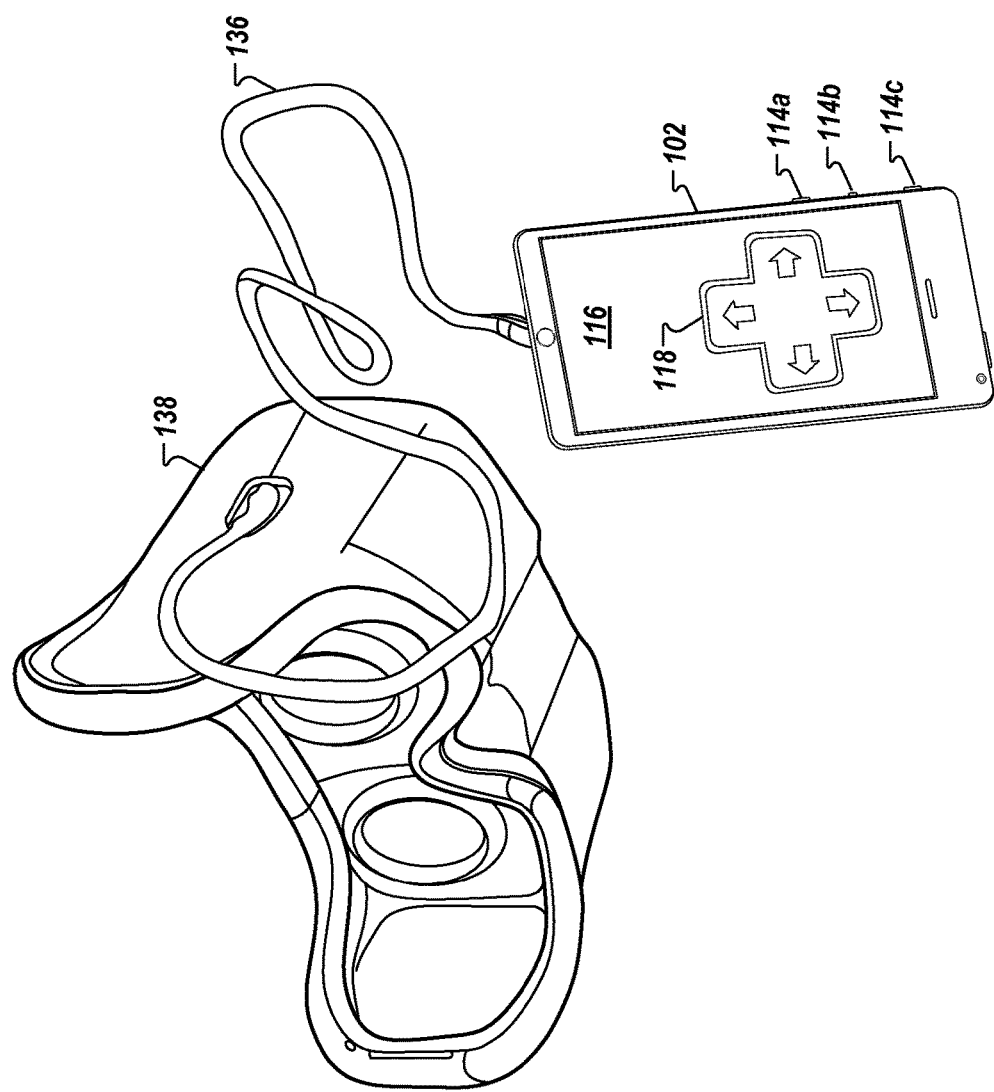
FIG. 1B is a diagram that illustrates an alternative example system for creating and interacting with a computer-generated, 3D environment (a VR space).

FIG. 1B is a diagram that illustrates an alternative example system 150 for creating and interacting with a computer-generated, 3D environment (a VR space). In the alternative example system 150 shown in FIG. 1B, a VR headset 138 can include a removable computing device that can execute a VR application. The removable computing device can be similar to the first computing device 102. The removable computing device can be incorporated within a casing or frame of a VR headset (e.g., the VR headset 138) that can then be put on by a user of the VR headset 138. In some implementations, the VR headset 138 can include a built-in computing device that includes hardware (e.g., a processor and memory) and/or software for executing a VR application to render/create a computer-generated, 3D environment (the VR space). In both implementations, the VR headset 138 can render/create the VR space.

Figure 1C:
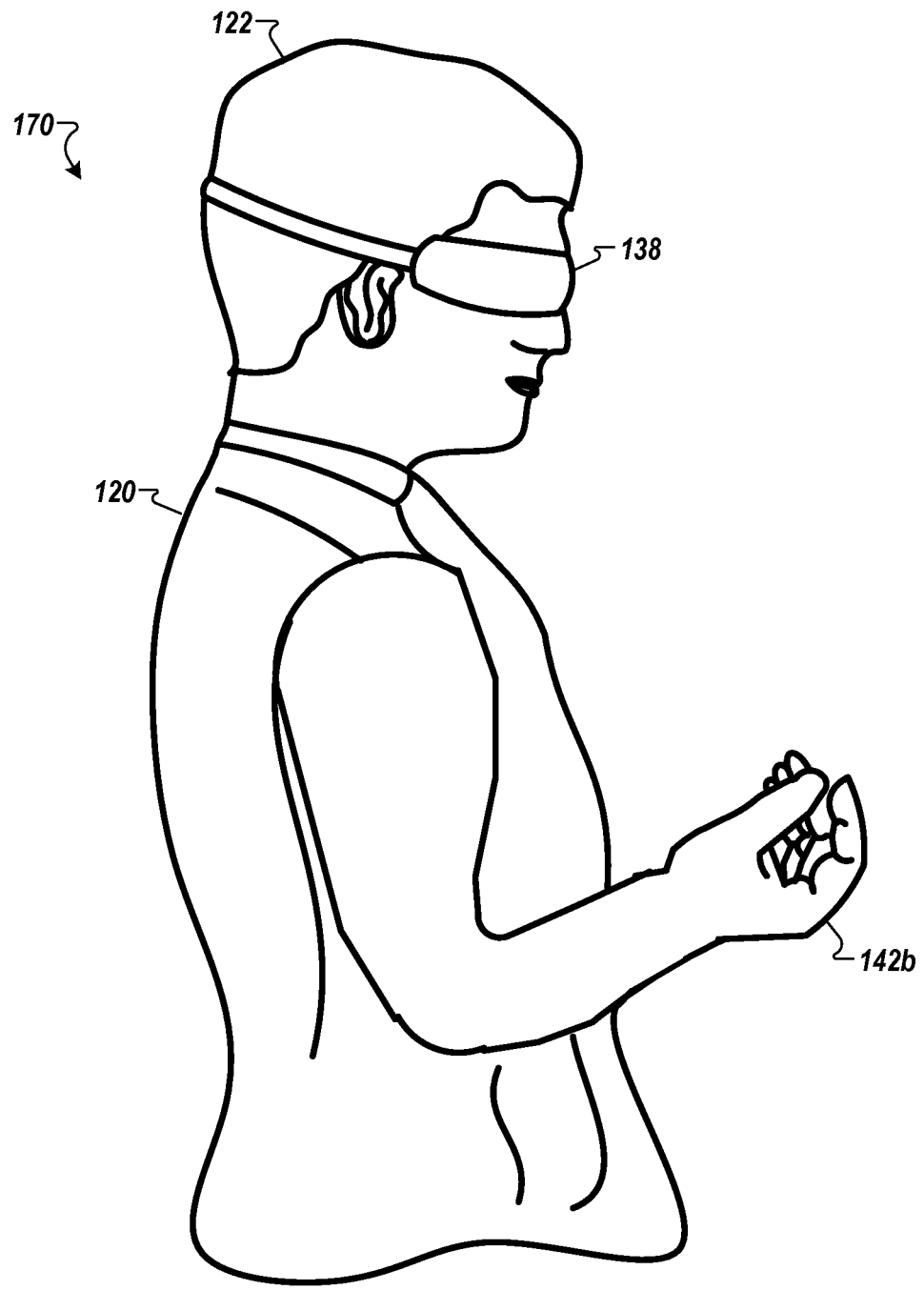
FIG. 1C shows a user wearing a VR headset and standing in an upright position.

FIG. 1C shows a user 120 wearing the VR headset 138 and standing in an upright position 170. Referring to FIG. 1B, in the alternative example system 150, the VR headset 138 includes a display or screen that the user 120 can view when interacting with a computer-generated, 3D environment (a VR space). In some implementations, a computing device included in the VR headset 138 can include the display or screen. As described above, the first computing device 102 can connect to the VR headset 138 using a wired or wireless interface protocol. In some implementations, the first computing device 102 can be a controller in the VR space, can appear as an object in the VR space, can provide input to the VR space, and can receive feedback/output from the VR space.

Referring to FIG. 1C, a computing device included in the VR headset 138 can include hardware (e.g., a processor and memory) and/or software that can track movement of a head 122 of the user 120 while wearing the VR headset 138. The tracked movement of the head 122 of the user 120 can be used to provide input to the VR space. In some implementations, the tracked movement can result in the selection of an object in the VR space. In addition, the tracked movement can transform the VR space from one state or application to another. The tracked movement can allow a user to delve (plunge, dig) into an activity, application, or state in the VR space. In some cases, the more pronounced the movement (the deeper the delving, plunging or digging) the more into or involved in the activity, application, or state a user can become. In some implementations, other inputs provided by the VR headset 138 in addition to or along with the tracked movement of the head 122 of the user 120 can be used to provide input to the VR space. For example, the tracked movement of the head 122 of the user 120 can be directed towards an object in the VR space. Further input provided by the VR headset 138, for example a pressing of a switch or activation of a control included in the VR headset 138, could result in the selection of the object in the VR space.

Figure 1D:
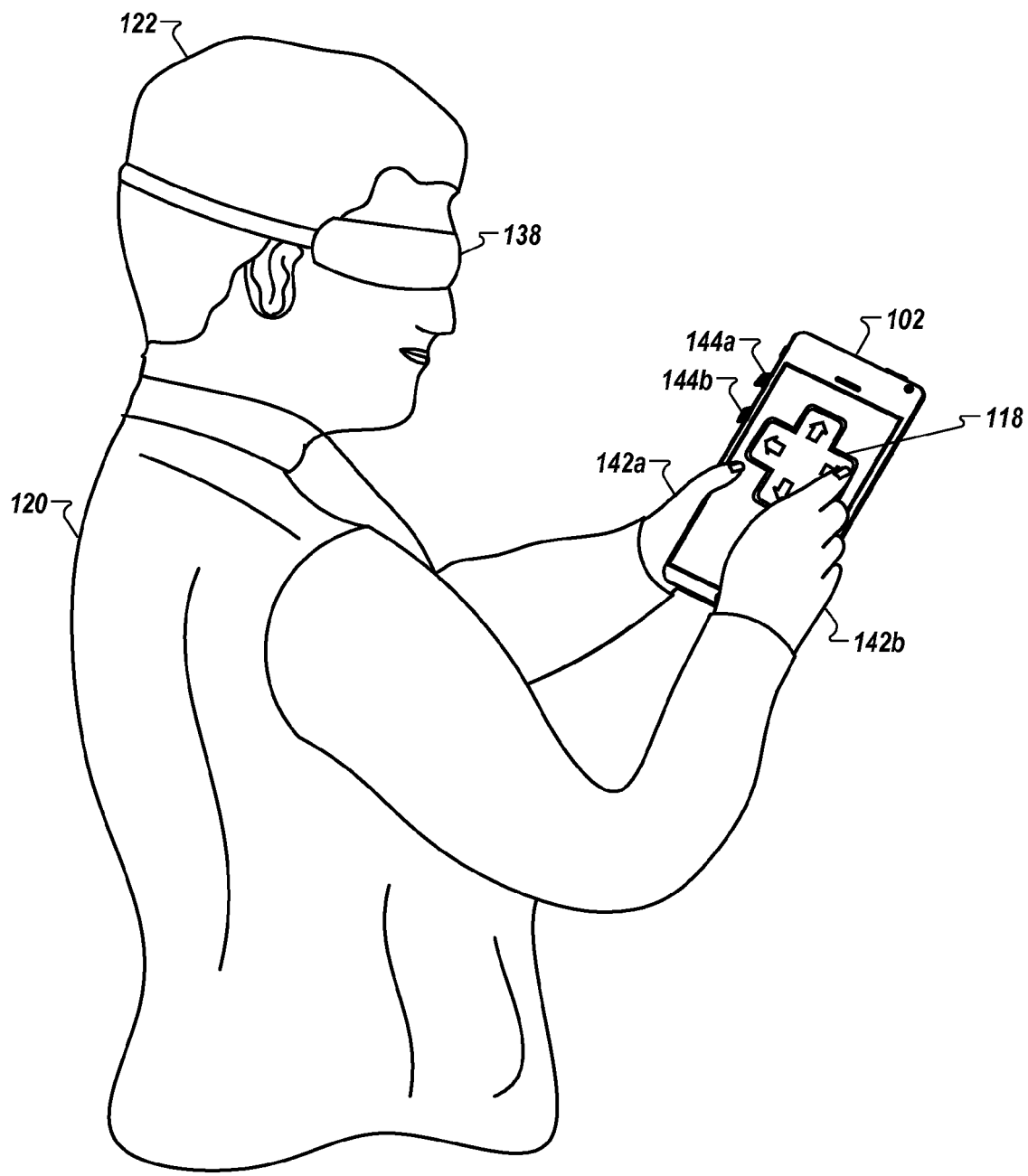
FIG. 1D shows a user wearing a VR headset and holding a computing device in a first hand, while interacting with an interface presented on a touchscreen of the computing device with a second hand.

FIG. 1D shows the user 120 wearing the VR headset 138 and holding the first computing device 102 in a first hand 142a, while interacting with an interface 118 presented on a touchscreen 116 of the first computing device 102 with a second hand 142b. In some implementations, as described herein referring to FIGS. 1A-B, the second computing device 104 can execute a VR application that can render/create a computer-generated, 3D environment (a VR space). The second computing device 104 can provide data representative of the VR space to the VR headset 138. The VR headset 138 can use the data to provide the computer-generated, 3D environment (the VR space) to the user 120 wearing the VR headset 138. In some implementations, as described herein referring to FIGS. 1A-D, a computing device included in the VR headset 138 can execute a VR application that can render/create a computer-generated, 3D environment (a VR space). In some implementations, as described herein referring to FIGS. 1A-D, a computing device included in the first computing device 102 can execute a VR application that can render/create a computer-generated, 3D environment (a VR space).

A computing device included in the VR headset 138 can include hardware and/or software that can recognize, monitor, and track 3D movement of the first computing device 102 when the first computing device 102 is placed in front of or held within a range of positions relative to the VR headset 138. In addition or in the alternative, the VR headset 138 can track movement of the head 122 of the user 120 that can be used as input to the VR space. The tracked movement can be translated into movement of the user within the VR space. In addition or in the alternative, the tracked movement can be used to select an object in the VR space. In addition, for example, the user 120 can interface with controls included on the first computing device 102 (e.g., one or more buttons (e.g., buttons 144a-b) and/or the interface 118 presented on the touchscreen 116 of the first computing device 102) to move within the VR space. In addition or in the alternative, tracked movement of the first computing device 102 by the VR headset 138 can be used to select an object in the VR space. Tracked movement can allow a user to delve (plunge, dig) into an activity, application, or state in the VR space. In some cases, the more pronounced the movement (the deeper the delving, plunging or digging) the more into or involved in the activity, application, or state a user can become.

Though in some implementations a VR headset (e.g., the VR headset 138) can use input provided from an external computing device (e.g., the first computing device 102) to translate into movement of the user within the VR space, the VR headset alone can be used to detect movement of a user (e.g., movement of the head 122 of the user 120) that is then translated into movement of the user within the VR space. The VR headset 138 can then continue to determine the degree of digging into (delving into, leaning into, plunging into) the object (and associated application) desired by the user by interpreting further movement of the user. Therefore, an external computing device (external from the VR headset 138) is not needed in order for a user to move about in the VR space.

In some implementations, referring to FIGS. 1A-D, though not specifically shown, a user (e.g., the user 120) can hold a type of hand-held computing device such as a joystick, controller, or a keyboard in a hand or hands of the user while wearing the VR headset 138. The user can use the hand-held computing device to control the movement of the user in the VR space and/or to control the selection of objects within the VR space.

The first computing device 102 (as well as any hand-held computing device) can connect to/communicate with the VR headset 138 using one or more high-speed communication protocols such as, for example, USB 2.0, USB 3.0 and USB 3.1. In some cases, the first computing device 102 can connect to/communicate with the VR headset 138 using an audio/video interface such as, for example, High-Definition Multimedia Interface (HDMI). In some cases, the first computing device 102 can connect to/communicate with the VR headset 138 using a DisplayPort Alternate mode for a USB Type-C standard interface. The DisplayPort Alternate mode can include a high-speed USB communication interface and DisplayPort functions.

In some implementations, the first computing device 102 can connect to the VR headset 138 wirelessly, as shown for example in FIG. 1D, without the need for a cable (e.g., cable 136). The first computing device 102 can connect to/communicate with the VR headset 138 wirelessly using one or more high-speed communication protocols such as, for example, WiFi, Bluetooth, or Bluetooth LE.

The cable 136 can include an appropriate connector on either end for plugging into the VR headset 138 and the first computing device 102. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

Figure 2A:
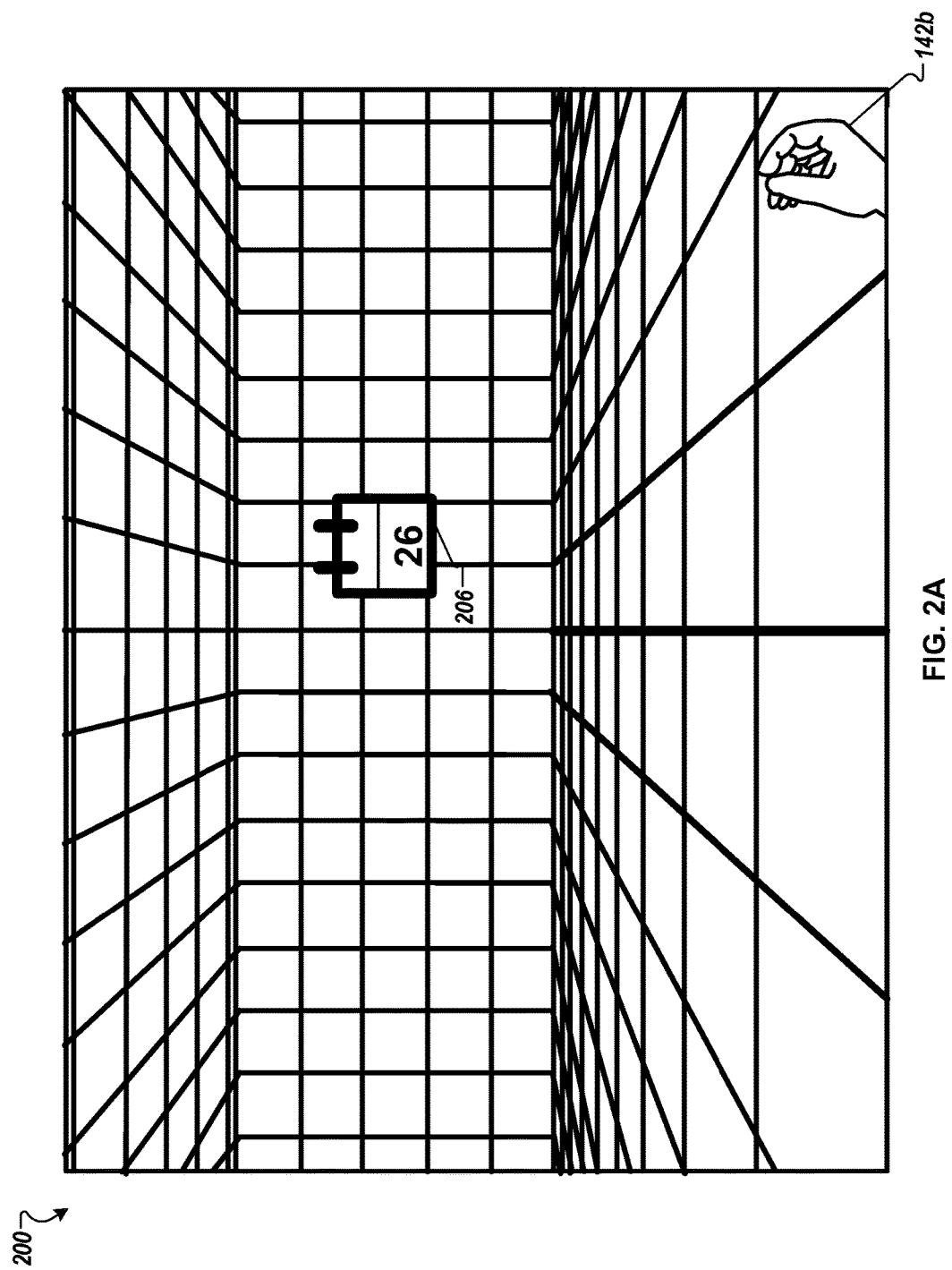
FIG. 2A is a diagram that illustrates a view of a first image that a user can view on a screen of a VR headset in a first VR space.

FIG. 2A is a diagram that illustrates a view of an image 200 that a user (e.g., the user 120) can view on a screen of a VR headset (e.g., the VR headset 138 as shown in FIGS. 1B-D) in a first VR space. For example, FIGS. 1C and 1D can show the user 120 as they are viewing the image 200.

An icon or object can represent one or more activities, applications, or states that can be accessed by a user in a first VR space. The icon can be semi-transparent. The icon can appear as floating or suspended in the first VR space. The icon can be visible but may not obstruct content included in the first VR space. In some implementations, the icon can appear as a flat, two-dimensional (2D) object in the first VR space. In some implementations, the icon can appear as a 3D object in the first VR space.

For example, referring to FIG. 2A, a 2D calendar icon 206 can represent a calendar application. The calendar icon 206 can appear as floating or suspended in the image 200. Referring to FIGS. 1A-D, in some implementations, the calendar application can execute/run on the first computing device 102. In some implementations, the calendar application can execute/run on the second computing device 104. In some implementations, the calendar application can execute/run on the computing device included in the VR headset 138.

The user 120 can start or enter the calendar application in the first VR space by moving towards and leaning into the plane of the calendar icon 206 (occupying some of the space of the calendar icon 206).

Figure 2B:
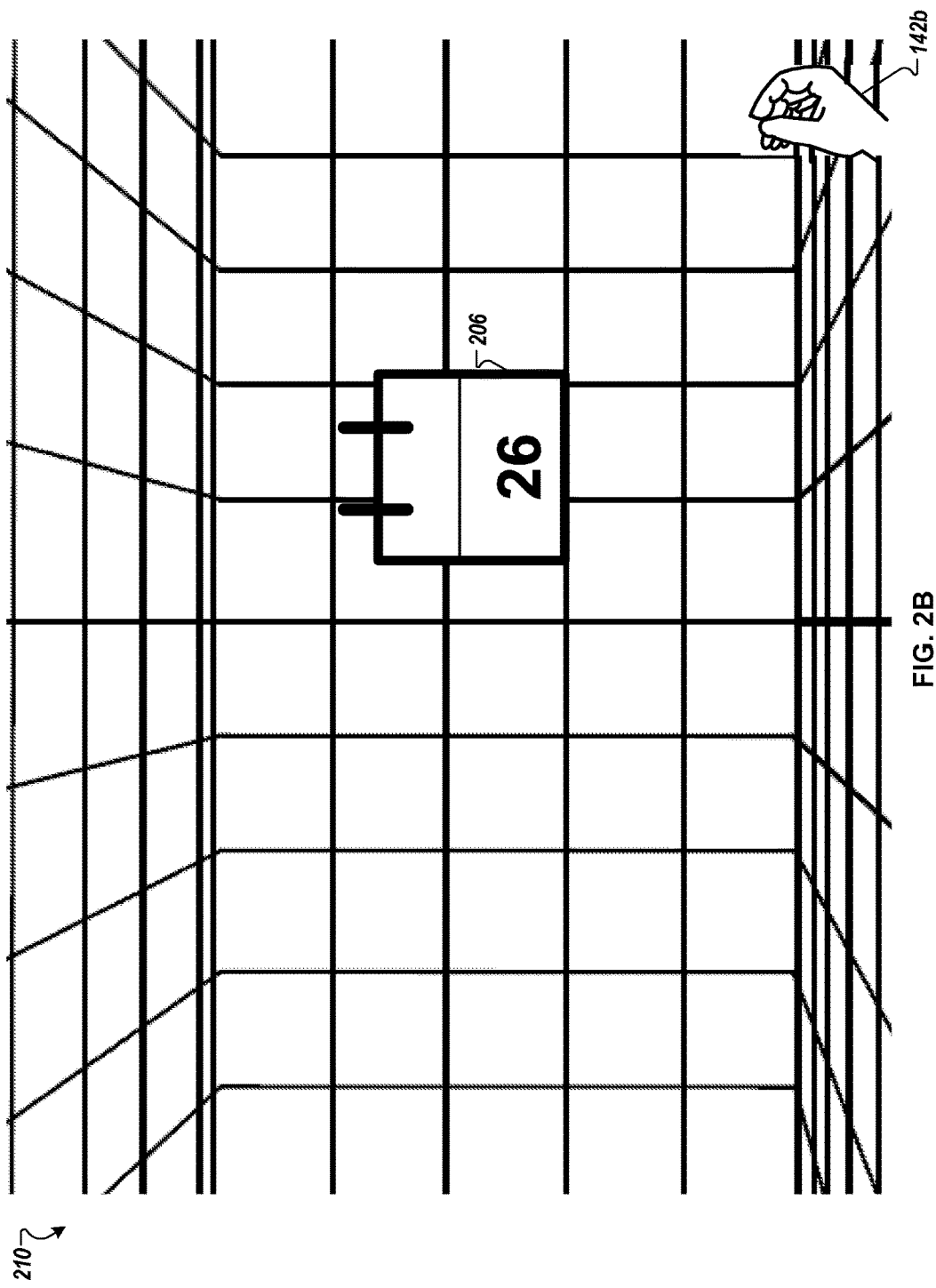
FIG. 2B is a diagram that illustrates a view of a second image that a user can view on a screen of a VR headset in a first VR space.

FIG. 2B is a diagram that illustrates a view of an image 210 that a user (e.g., the user 120) can view on a screen of a VR headset (e.g., the VR headset 138 as shown in FIGS. 1B-D) in the first VR space. The view shows the image 210 that represents what the user sees as the user moves towards and closer to the calendar icon 206.

FIG. 2C is a diagram that shows a third-person view 220 of the VR space when the movement of the user 120 (e.g., the head 122 of the user 120) is rendered/interpreted as leaning (diving, delving, plunging or digging) into the calendar icon 206. For example, once the movement is rendered, the leaning into the calendar application can execute and provide a view of the calendar of the user 120.

As described with reference to FIGS. 1A-D, in some implementations the VR headset 138 can track movement of the head 122 of the user 120. The tracked movement can be translated into movement of the user within the VR space. In some implementations, the user 120 can interface with controls included on the first computing device 102 (e.g., one or more buttons (e.g., buttons 144a-b) and/or the interface 118 presented on the touchscreen 116 of the first computing device 102) to move within the VR space. In some implementations, the user 120 can hold a hand-held computing device (e.g., a joystick, a controller, or a keyboard) in the hands 142a-b of the user while wearing the VR headset 138. The user can use the hand-held computing device to control the movement of the user in the VR space.

Figure 2D:
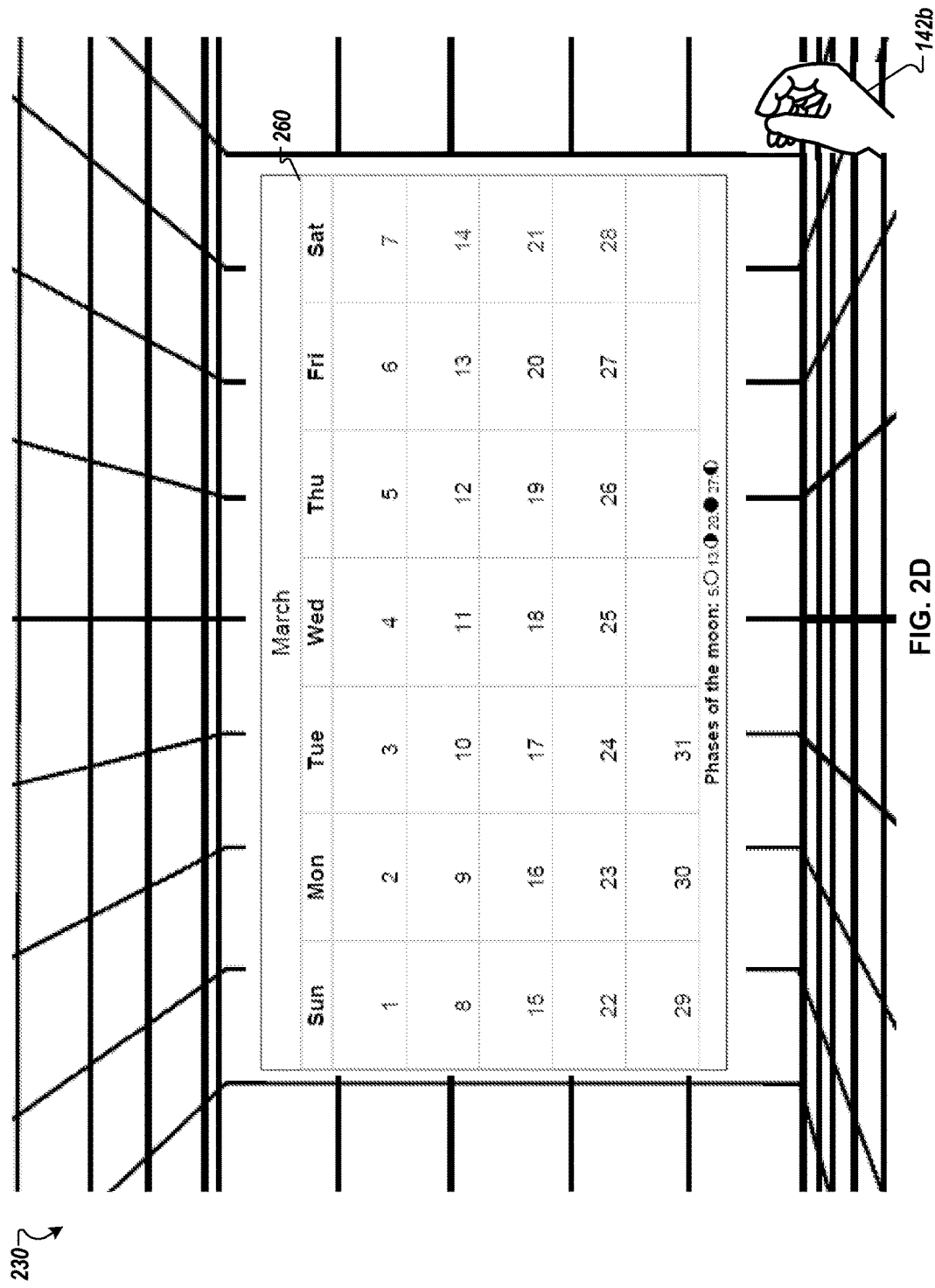
FIG. 2D is a diagram that shows a view of a third image that a user can view on a screen of a VR headset in a first VR space that shows a view of a calendar of the user for a particular month.

FIG. 2D is a diagram that shows a view of an image 230 that a user (e.g., the user 120) can view on a screen of a VR headset (e.g., the VR headset 138 as shown in FIGS. 1B-D) in the first VR space that shows a view of a calendar of the user for a particular month (calendar view 260).

The user 120 can continue to move in the same direction, moving further into the calendar icon 206, occupying more of the same space as the calendar icon 206.

Figure 2E:
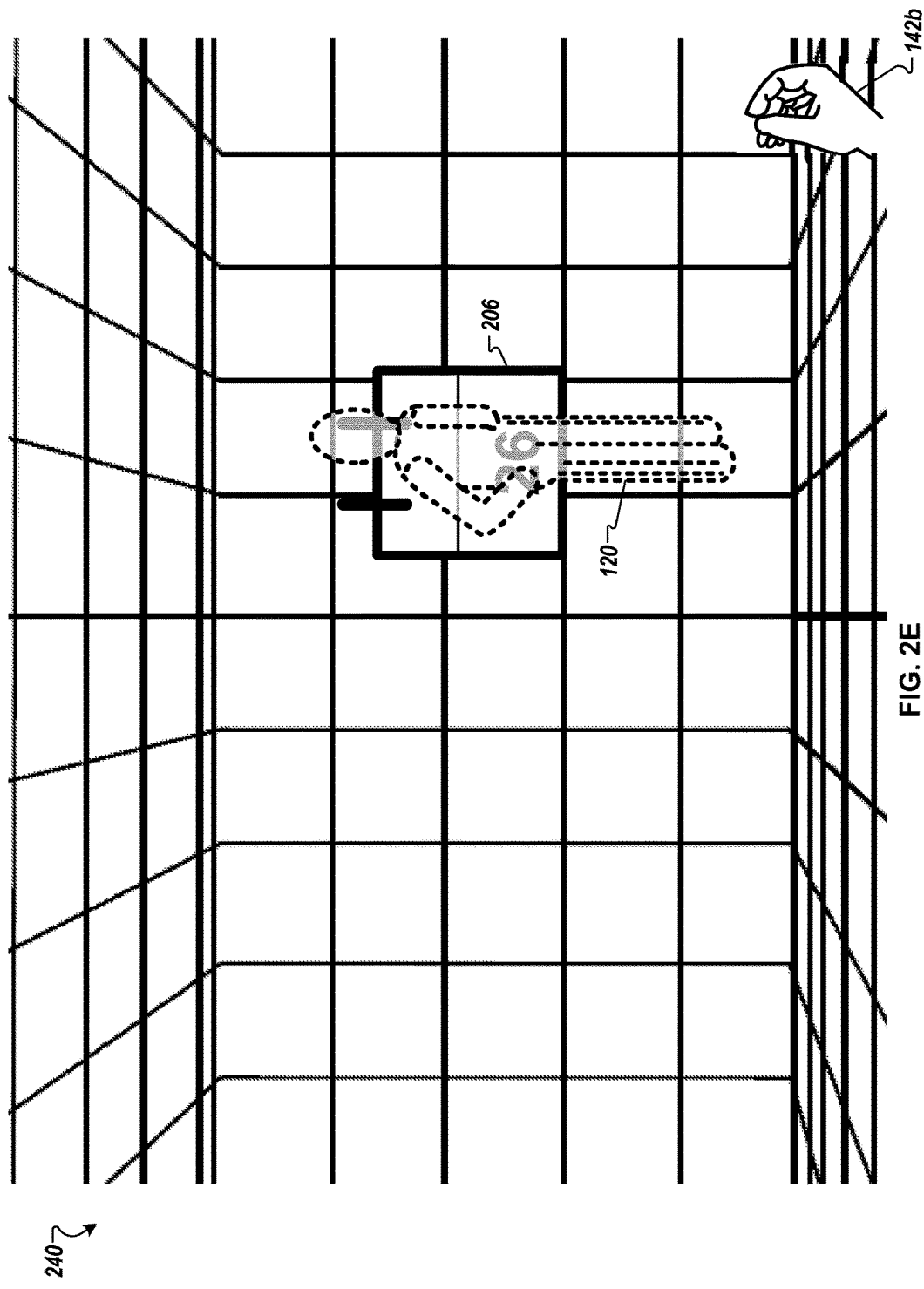
FIG. 2E is a diagram that shows a third-person view of a first VR space when the movement of a user is rendered/interpreted as leaning (diving, delving, plunging or digging) into an icon.

FIG. 2E is a diagram that shows a third-person view 240 of the first VR space when the movement of the user 120 is rendered/interpreted as leaning (diving, delving, plunging or digging) into the calendar icon 206.

The continued movement can be rendered/interpreted as further movement of the user 120 into the calendar icon 206 (increased leaning, or delving, plunging or diving deeper into the calendar icon 206 (the space occupied by the calendar icon 206 in the VR space)) resulting in further immersion into the calendar application. For example, the further movement into the calendar icon 206 (further movement into the same space as occupied by the calendar icon 206 in the VR space) can result in the calendar application providing increased detail or information such as a view of the calendar of the user 120 for the current day.

Figure 2F:
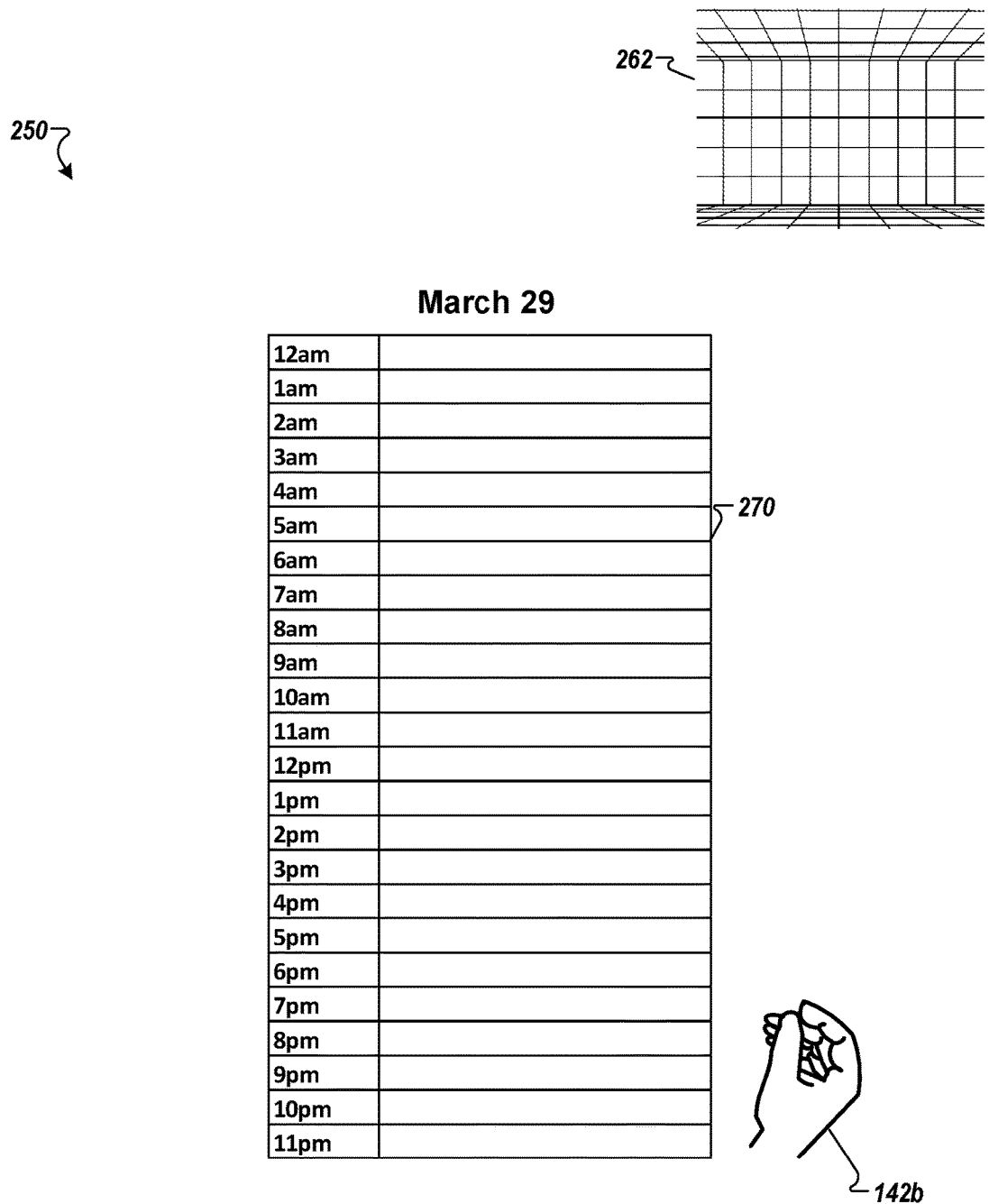
FIG. 2F is a diagram that shows a view of a fourth image that a user can view on a screen of a VR headset in a second VR space that shows a view of a calendar of the user for a particular day.

FIG. 2F is a diagram that shows a view of an image 250 that a user (e.g., the user 120) can view on a screen of a VR headset (e.g., the VR headset 138 as shown in FIGS. 1B-D) in a second VR space that shows a view of a calendar of the user for a particular day (calendar view 270). A first VR application icon 262, representing the paused VR application that was running/executing in the first VR space, can be included in the second VR space.

Once the user 120 has completed interactions with the calendar application, similar to when the user 120 moved into the calendar icon in FIG. 2E (and also as described with reference to FIG. 2C), the user 120 can lean (dive, delve, plunge or dig) into the VR application icon 262 to resume the execution of the paused VR application and end the execution of the calendar application.

As described with reference to FIGS. 1A-D, in some implementations the VR headset 138 can track movement of the head 122 of the user 120. The user 120 can rotate (move) the head 122 of the user 120 to transfer focus in the VR space from the calendar application and to the VR application icon 262. In some implementations, the user 120 can interface with controls included on the first computing device 102 (e.g., one or more buttons (e.g., buttons 144a-b) and/or the interface 118 presented on the touchscreen 116 of the first computing device 102) to move focus in the VR space from the calendar application and to the VR application icon 262. In some implementations, the user 120 can hold a hand-held computing device (e.g., a joystick, a controller, or a keyboard) in the hands 142a-b of the user while wearing the VR headset 138. The user can use the hand-held computing device to control the movement of the user in the VR space to navigate from the calendar application to the VR application icon 262.

In some cases, the user 120 can navigate within the VR space to lean into (share some space with) the calendar icon 206 as described in FIG. 2C resulting in the display of the calendar view 260 in the VR space as shown in FIG. 2D. The user 120 can navigate within the VR space to lean out of (back out of, lean away from) the calendar icon 206 returning to viewing the image 200 in the VR space. The user 120 can peek at information in other applications, perform a quick action, or check on a state of an application without completely leaving (stopping the execution of) the current VR application they are executing/running in a VR space. In some implementations, the calendar view 260 can float or hover over the image 200. The calendar view 260 may be fully or semi-transparent allowing the user 120 to see the information provided by the calendar view 260 while continuing to view the image 200.

Though the examples shown in FIGS. 2A, 2C, and 2E show the single calendar icon 206, in some implementations, multiple icons each representing a specific application, action, or state can be placed as floating or suspended in various locations within the VR space. In some implementations, one or more of the icons may rotate, vibrate, change color, change size, change shape, or otherwise draw the attention of the user 120 to the icon. This can occur if the application needs the attention of the user. For example, the calendar icon 206 can morph, rotate, and change shape and/or size to get the attention of the user 120. This can occur if an alert, alarm, or other indicator has occurred in the calendar application that may warrant the attention of the user 120. For example, the user 120 has a meeting in fifteen minutes.

Figure 3A:
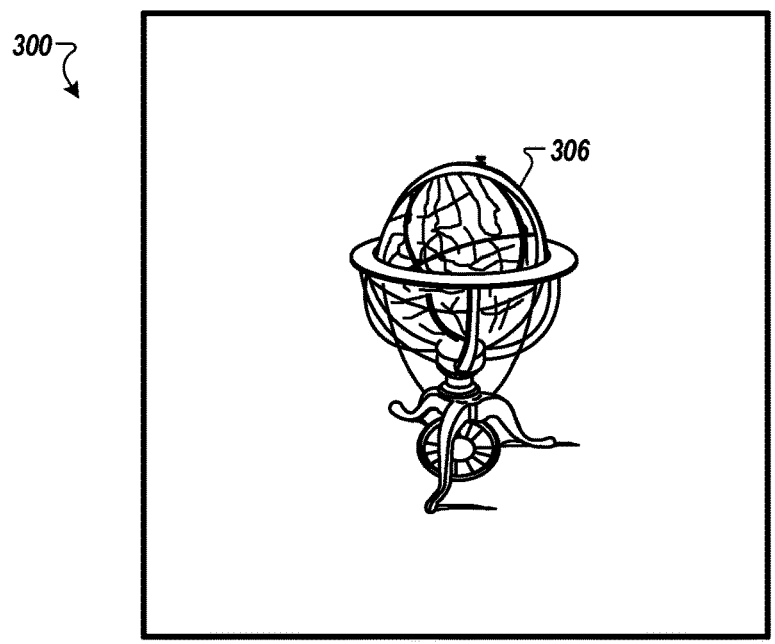
FIG. 3A is a diagram that shows a first user (first-person) view of a VR space.

FIG. 3A is a diagram that shows a first user (first-person) view 300 of a VR space. In the example shown in FIG. 3A, the VR space includes a globe 306. The globe 306 can be an object in the VR space that represents one or more applications, actions, or states.

Figure 3B:
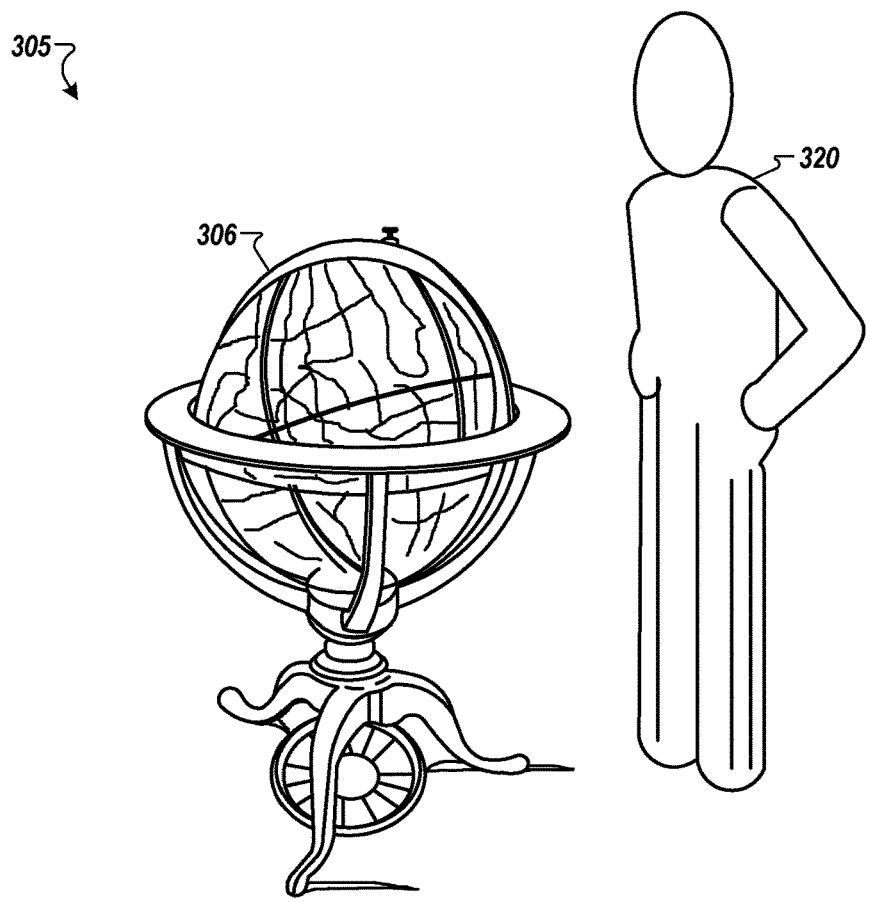
FIG. 3B is a diagram that shows a first third-person view of the VR space shown in FIG. 3A.

FIG. 3B is a diagram that shows a first third-person view 305 of the VR space shown in FIG. 3A. In the first third-person view 305, a user 320 approaches the globe 306. Referring to FIG. 1C, the user 320 can be the user 120 as shown in FIG. 1C. The user 320 can be wearing a VR headset (e.g., the VR headset 138) and standing in an upright position (e.g., the upright position 170) as the user 320 approaches the globe 306 in the VR space. As described with reference to FIG. 1C, the VR headset can include a display or screen that the user 320 can view when interacting with a computer-generated, 3D environment (the VR space).

Figure 3D:
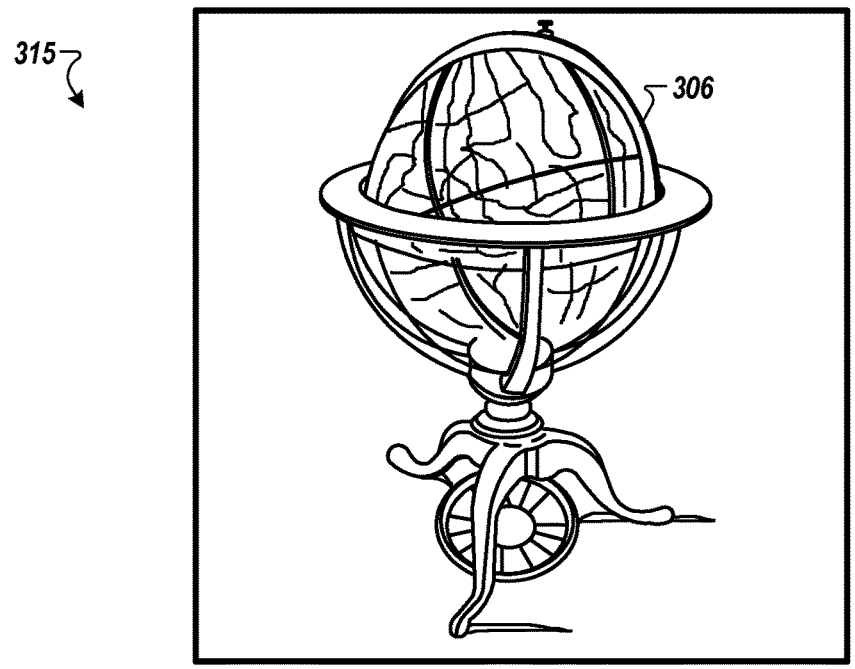
FIG. 3D is a diagram that shows a second user (first-person) view of the VR space as shown in FIG. 3C.
Figure 3C:
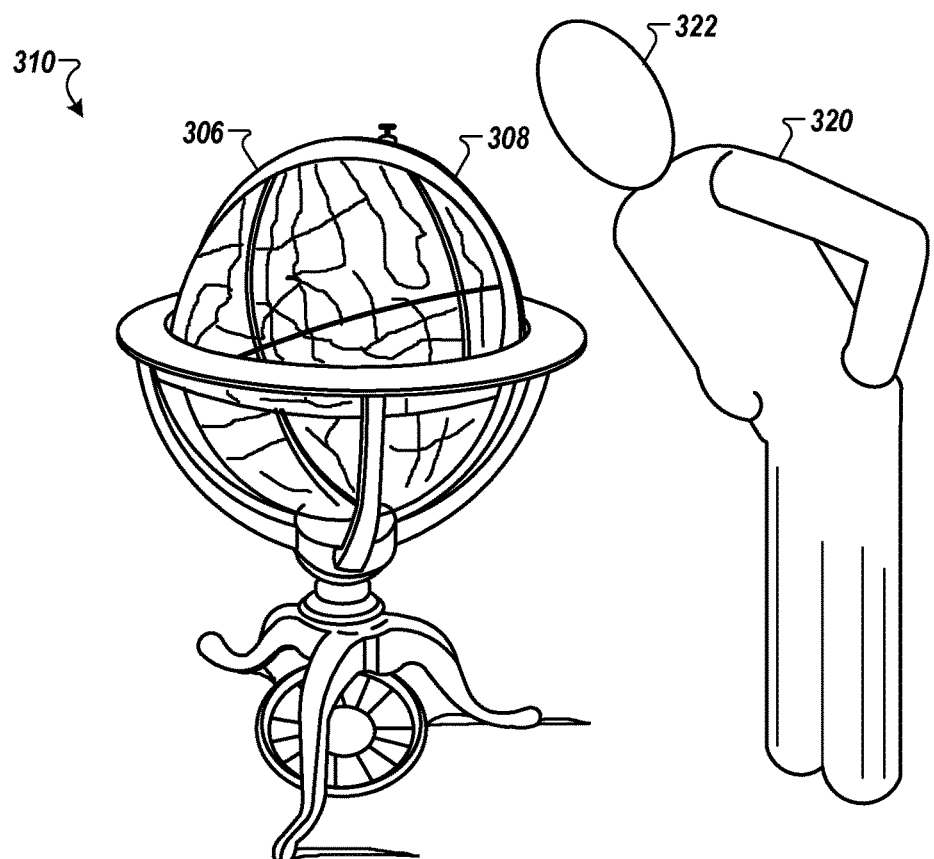
FIG. 3C is a diagram that shows a second third-person view of the VR space.

FIG. 3C is a diagram that shows a second third-person view 310 of the VR space. In the example shown in FIG. 3C, the user 320 takes a closer look at the globe 306. This is represented in the second third-person view 310 as a head 322 of the user 320 being closer to a surface 308 of the globe 306. As described with reference to FIGS. 2A-F, the user 320 can navigate in the VR space towards the globe 306. The user 320 can move the head 322 of the user 320, while wearing the VR headset 138 and/or the user 320 can interface with one or more hand-held computing devices in order to move towards the globe 306 in the VR space.

FIG. 3D is a diagram that shows a second user (first-person) view 315 of the VR space as shown in FIG. 3C. The globe 306 appears larger in the second user view 315 as compared to the first user view 300 of the globe 306 as shown in FIG. 3A. The perceived larger size of the globe 306 is based on the user 320 being closer to the globe 306 in the second third-person view 310 as compared to the first third-person view 305.

For example, the globe 306 can be an object in the VR space that represents/is associated with a map application. The user 320 can start or enter the map application in the VR space by further continuing to move towards (navigate within the VR space towards) the globe 306 such that the movement is rendered as leaning into and just breaking the surface of the globe 306.

Figure 3F:
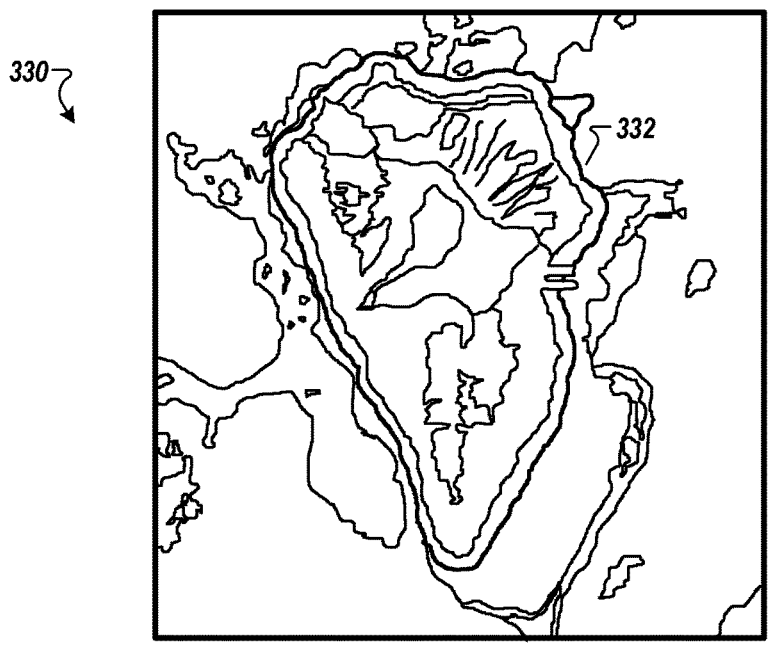
FIG. 3F is a diagram that shows a third user view of the VR space as an overhead map view as seen in a VR space by a user.
Figure 3E:
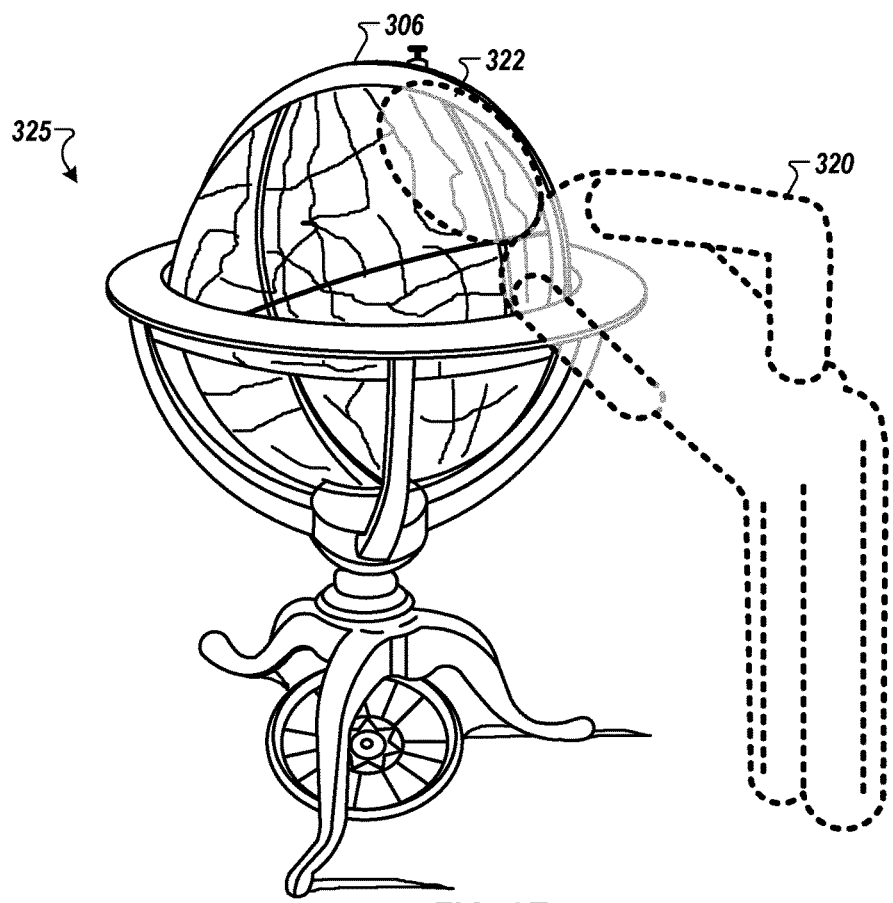
FIG. 3E is a diagram that shows a third third-person view of a VR space when movement of a user is rendered/interpreted as leaning (diving, delving, plunging, dipping or digging) into a globe.

FIG. 3E is a diagram that shows a third third-person view 325 of the VR space when the movement of the user 320 (e.g., the head 322 of the user 320) is rendered/interpreted as leaning (diving, delving, plunging, dipping or digging) into the globe 306. For example, once the movement is rendered, the leaning into the globe 306 can start or launch a map application. The map application can execute and provide an overhead map view 332 in the VR space as shown in FIG. 3F.

FIG. 3F is a diagram that shows a third user view 330 of the VR space as an overhead map view 332 as seen in the VR space by the user 320. The information included in the overhead map view 332 can be based on an amount of space shared by the user 320 in the globe 306. For example, the overhead map view 332 is a map of the island of La Palma, one of the Canary Islands.

In some cases, the user 320 may move around the surface 308 of the globe 306 by navigating within the VR space in order to "see" (have the map application provide) different overhead map views of other areas (e.g., countries, continents) on the globe 306. In some cases, the user 320 may then navigate away from (lean out of, back out of, lean away from) the globe 306, no longer occupying any shared space with the globe 306 in the VR space. The ability to lean in and out of an object can allow the user 320 to peek at information in applications, perform a quick action, or check on a state without completely leaving (stopping the execution of) the current application they are executing/running in VR space. In the example shown in FIGS. 3A-J, the user 320 may be exploring a virtual room in a virtual museum (the example VR space) where the globe 306 is just one object among many included in the room. The user 320 can navigate away from (lean out of) the globe 306 and proceed to navigate towards and share space with (lean into) another object in the VR space for another user experience.

Figure 3G:
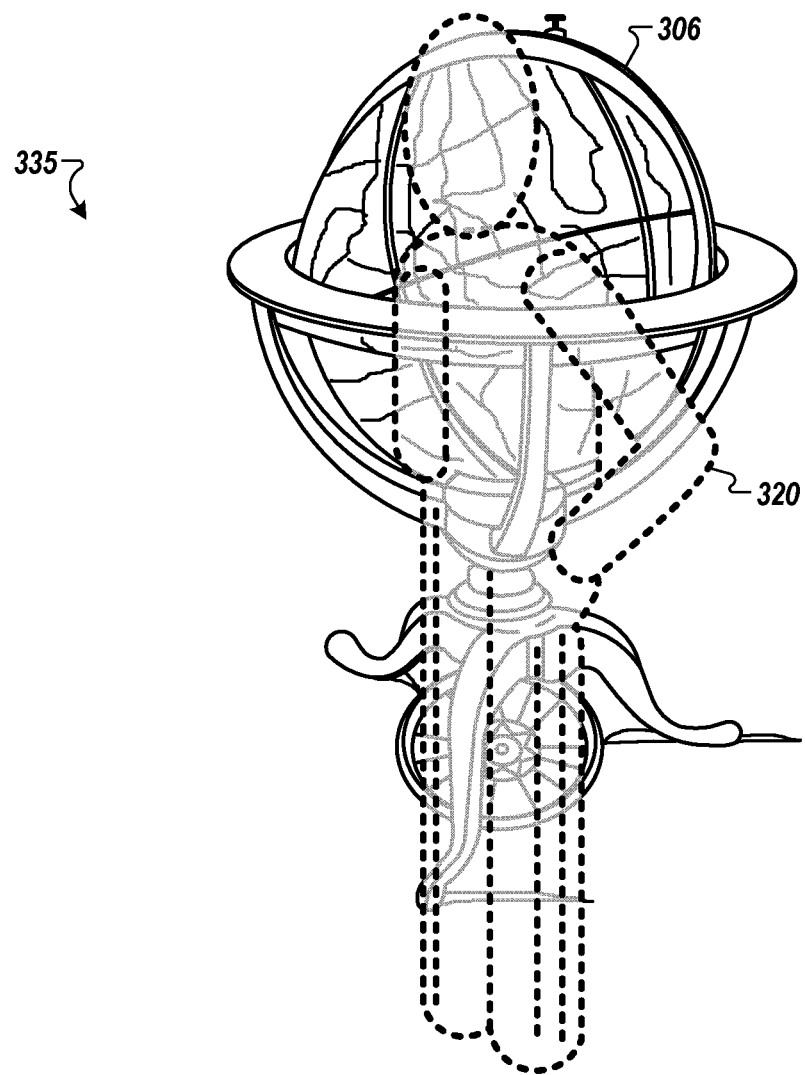
FIG. 3G is a diagram that shows a fourth third-person view of a VR space with a user a standing inside a globe.

In some cases, once the user shares some space with the object the user 320 can continue to move in the same direction (move further into the object and share more space with the object) resulting in the user 320 entering the globe 306 as shown in a fourth third-person view 335 in FIG. 3G.

FIG. 3G is a diagram that shows the fourth third-person view 335 of the VR space with the user 320 totally immersed in (standing inside of) the globe 306. For example, the VR space perspective can fully shift to the map application (and a complete user maps experience in the VR space). The entry into the map application can transport the user 320 to a finer resolution, more detailed location on the globe 306. For example, the user 320 can further explore the location shown in the overhead map view 332 as shown in FIG. 3F.

Figure 3H:
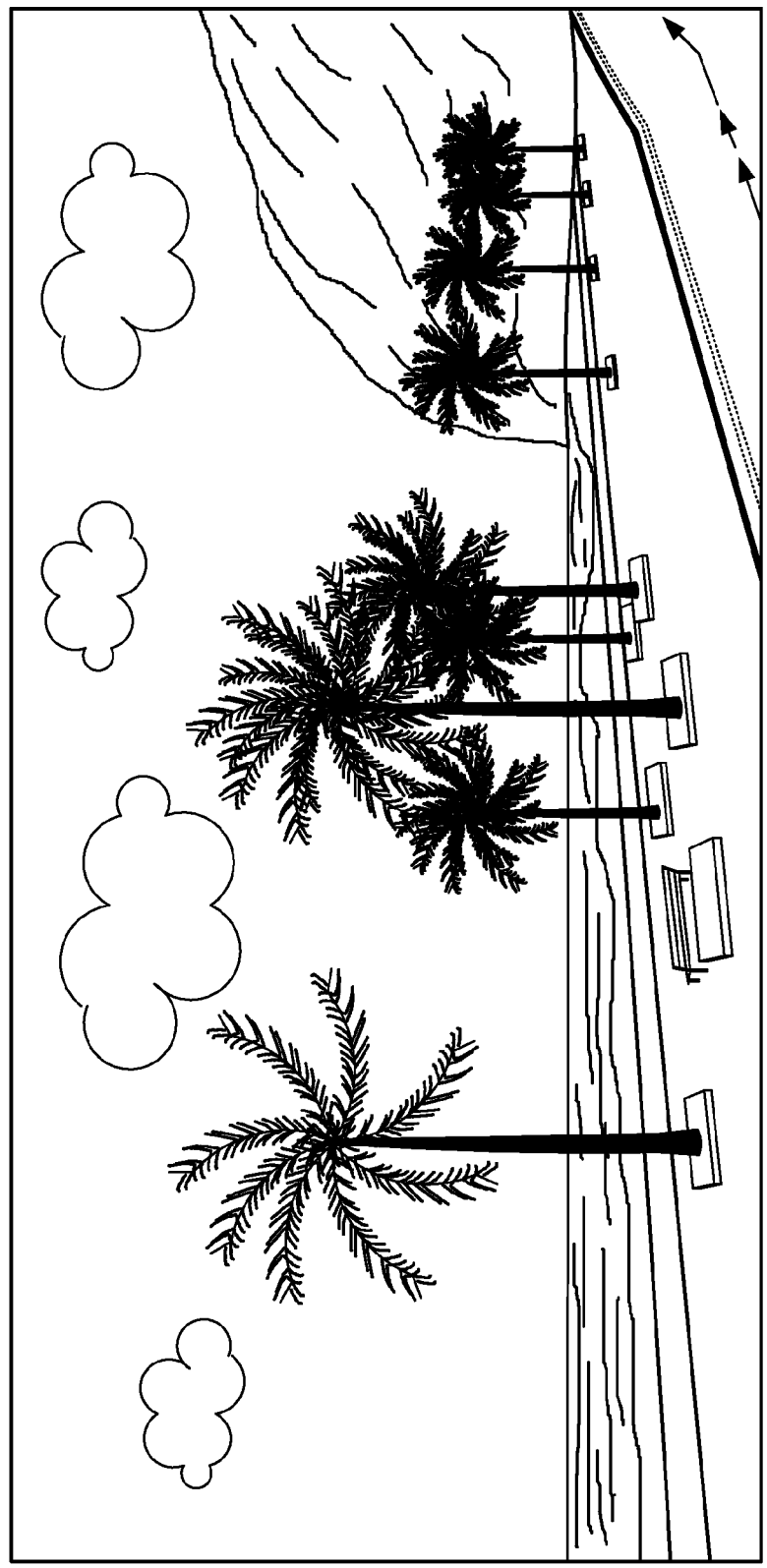
FIG. 3H is a diagram that shows a fourth user (first-person) view of the VR space as shown in FIG. 3G.

FIG. 3H is a diagram that shows a fourth user (first-person) view 340 of the VR space as shown in FIG. 3G. For example, the user 320 is transported to a boardwalk by a beach on the island of La Palma. Now that the user 320 is transported to the map experience shown in the fourth user view 340, the user 320 may move around in the map experience (navigate another VR space) exploring the VR space. In order to exit the map experience (and the entry into the globe 306), the user 320 may perform a deliberate action. The action can explicitly exit the user from the globe 306 in the VR space, ending the map experience (exiting or stopping the execution of the map application).

Figure 3I:
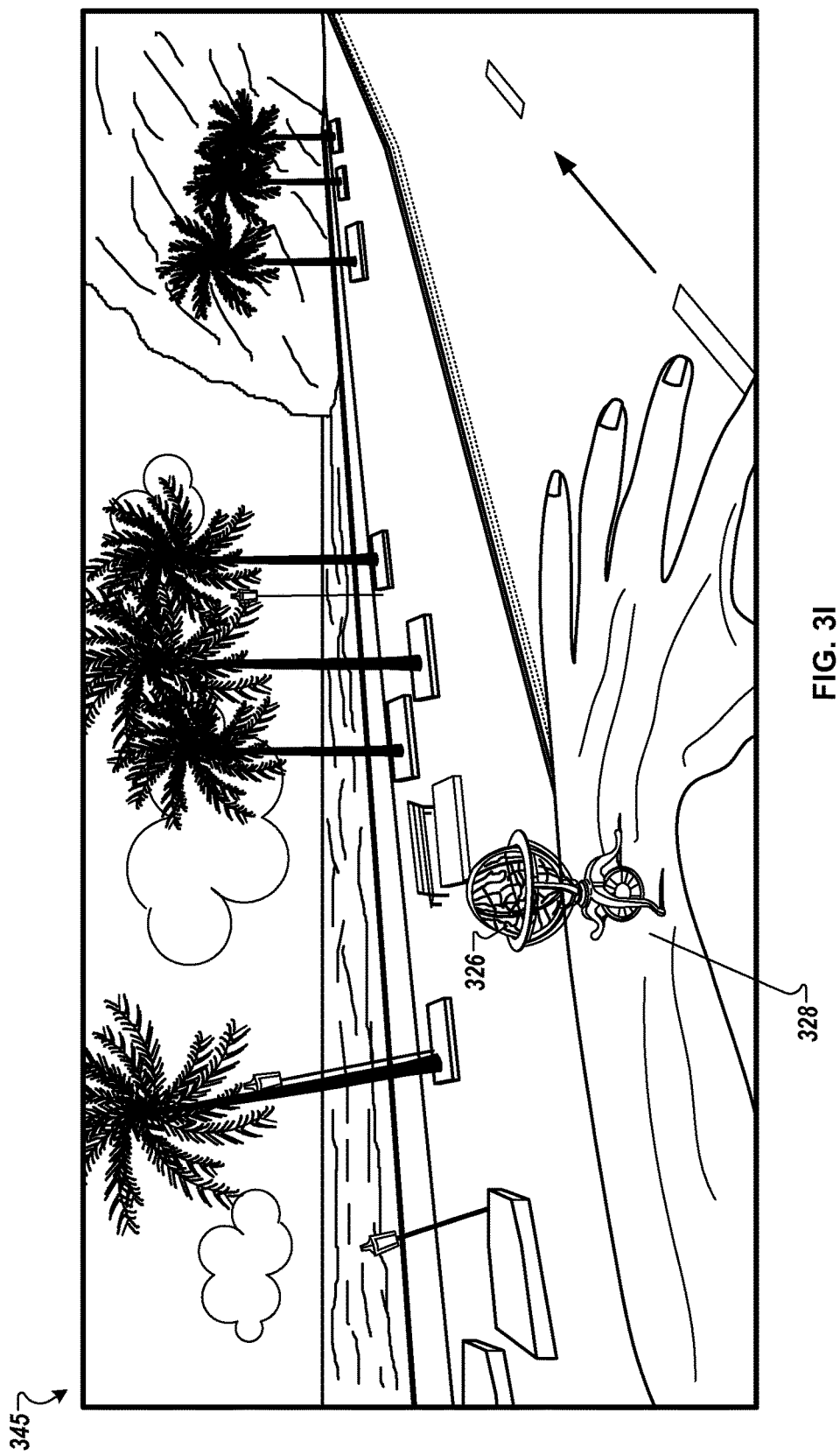
FIG. 3I is a diagram that shows a fifth user (first-person) view of the VR space as shown in FIG. 3G.

FIG. 3I is a diagram that shows a fifth user (first-person) view 345 of the VR space as shown in FIG. 3G. In the fifth user view 345, a globe icon 326 can float (hover) on a rendering of a wrist (wrist rendering 328) of the user 320 in the VR space. The user 320 can interact with the globe icon 326 (e.g., navigate towards and break the surface of the globe icon 326) to exit the globe 306 that they entered in the VR space as shown in FIG. 3G. Once the user 320 exits the globe 306, the VR space can appear as the first third-person view 305 of the VR space shown in FIG. 3A The user 320 can navigate towards the globe icon 326 as described herein and can select the globe icon 326 to exit the globe 306 and stop (end) the execution of the map application, ending the map experience. For example, referring to FIGS. 1A-D, the user 320 can be wearing a VR headset. The VR headset can track movement of the head 322 of the user 320. The user 320 can rotate (move) the head 322 of the user 320 to transfer focus in the VR space to the globe icon 326. The user 320 can select the globe icon 326 by moving the head 322 of the user 320 in the direction of the globe icon 326 and then dwelling on the globe icon 326 for at least a predetermined amount of time. In another example, the user 320 can select the globe icon 326 by moving the head 322 of the user 320 in the direction of the globe icon 326 and then using one or more controls included in the VR headset to "click on" the globe icon 326. In another example, the user 320 can select the globe icon 326 by moving the wrist of the user 320 closer to the head 322 of the user 320. The globe icon 326 can be considered selected when the wrist of the user 320 is within a predetermined distance from the head 322 of the user 320.

In some implementations, the user 320 can interface with controls included on a hand-held computing device (e.g., one or more buttons and/or an interface presented on a touchscreen of the hand-held computing device) to move focus (navigate) in the VR space to the globe icon 326. In some implementations, the user 120 can hold the hand-held computing device (e.g., a mobile phone, a mobile computing device, a joystick, a controller, or a keyboard) in one or more hands of the user 320 while wearing the VR headset. The user can use the hand-held computing device to control the movement of the user in the VR space to navigate to the globe icon 326. The user 320 can lean into (share some space with) the globe icon 326 to exit the globe 306 and stop (end) the execution of the map application, ending the map experience.

In some implementations, the globe 306 can represent a single application (e.g., a map application). In some implementations, the globe 306 can represent related applications that provide a user experience. The further the user leans (plunges, dives, or delves) into the globe 306 in the VR space the further into the experience the user can go. For example, as shown in FIGS. 3E and 3F, at a small or initial lean-in, the user sees a map of La Palma Island included in the Canary Islands. Further leaning into the globe can narrow or fine-tune the location viewed by the user (e.g., the boardwalk on a beach on La Palma Island). Though not shown, the user may lean in further to obtain travel information for travel to La Palma Island. In this example, the map application may call another application (or pass control to another application (e.g., a travel accommodation booking application)) that can provide the detailed travel information. As the user backs out of the globe 306, the travel accommodation booking application can pass control back to the map application.

In some implementations, the globe 306 can be included in a virtual room that includes other icons that represent other objects in the room (e.g., furniture, paintings, and sculptures) that a user can lean (plunge, dive, or delve) into in order to start, enter or launch an application associated with icon (object).

Figure 4:
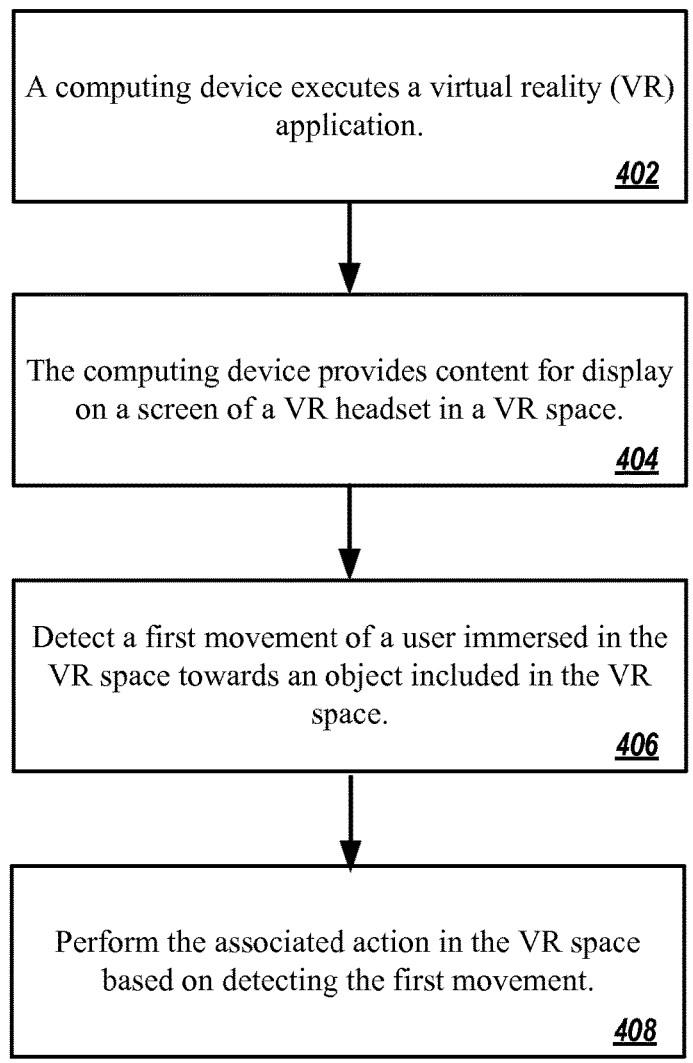
FIG. 4 is a flowchart that illustrates a method for interacting with an object included in a VR space.

FIG. 4 is a flowchart that illustrates a method 400 for interacting with an object included in a VR space. In some implementations, the systems, methods, and processes described herein can implement the method 400. For example, the method 400 can be described referring to FIGS. 1, 2, and 3A-I.

A computing device executes a virtual reality (VR) application (block 402). The computing device provides content for display on a screen of a VR headset in a VR space (block 404). The content can include at least one object associated with an action. A first movement of a user immersed in the VR space towards an object included in the VR space is detected (block 406). The associated action is performed in the VR space based on detecting the first movement (block 408).

Figure 5:
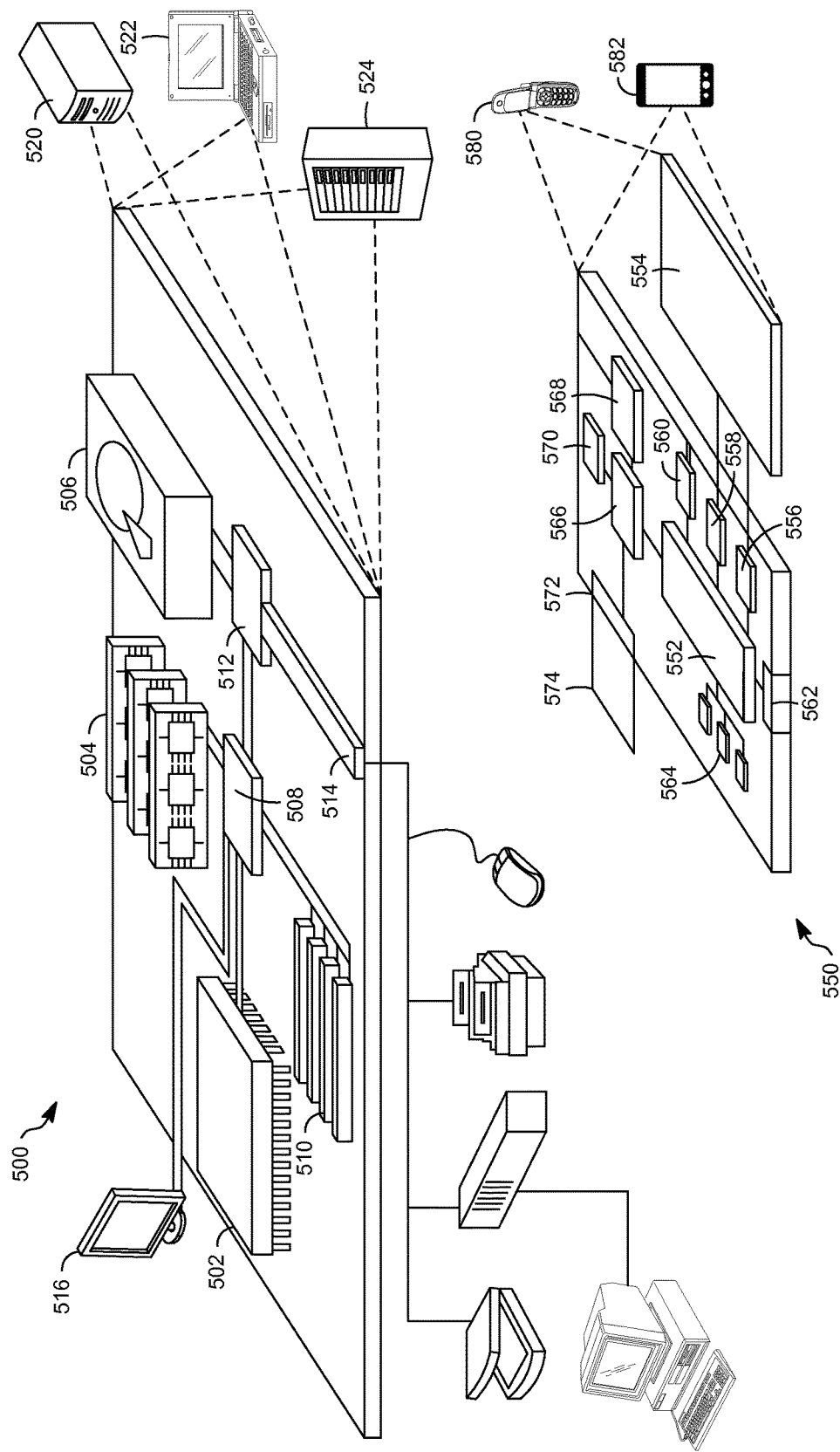
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   executing, by a computing device, a virtual reality (VR) application, the executing displaying first content on a screen of a VR headset;
   providing, by the computing device, an object for display on the screen of the VR headset as a first floating icon by the VR application, the object being associated with an action, the first floating icon being displayed along with the first content, and a location on the screen of the displayed first floating icon being independent of the displayed first content;
   detecting a first movement of a user as movement towards the object;
   in response to the detecting the first movement:
      altering the first content for display on the screen of the VR headset as second content; and
      providing, by the computing device, the second content and the object for display on the screen of the VR headset as a second floating icon by the VR application, the second floating icon being displayed along with the second content, and a location on the screen of the displayed second floating icon being independent of the displayed second content;
   subsequent to detecting the first movement, detecting a second movement of the user as movement further towards the object; and
   in response to detecting the second movement, performing the associated action including providing third content for display on the screen of the VR headset by the VR application, the third content including content generated by the performing of the associated action.

2. The method of claim 1, wherein the computing device is included in the VR headset.

3. The method of claim 1, wherein the associated action is the execution of an application.

4. The method of claim 1, further comprising:
   detecting a third movement of the user as movement away from the object, the detecting occurring subsequent to detecting the second movement of the user; and
   stopping the performing of the associated action in response to detecting the third movement.

5. The method of claim 4,
   wherein stopping the performing of the associated action includes providing the first content for display on the screen of the VR headset.

6. The method of claim 1,
   further comprising receiving an indication of an interaction by the user with an object included in the third content; and
   wherein performing the associated action further includes providing the first content for display on the screen of the VR headset by the VR in response to receiving the indication of the interaction.

7. The method of claim 1,
   wherein the first floating icon is transparent, and
   wherein the second floating icon is transparent.

8. The method of claim 1, wherein the second floating icon is of a different size than the first floating icon.

9. The method of claim 1, wherein altering the first content includes zooming in on the first content.

10. The method of claim 1, wherein a size of the second floating icon is larger than a size of the first floating icon.

11. The method of claim 1, wherein the third content is independent of the second content, and wherein the third content is independent of the first content.

12. The method of claim 1, wherein the third content is displayed with the second content on the screen of the VR headset by the VR application.

13. The method of claim 1, wherein the third content is displayed superimposed on the second content.

14. The method of claim 13, wherein the third content is transparent such that information provided by the third content is viewed by the user along with viewing of the second content.

15. The method of claim 3, wherein prior to detecting the first movement of the user as movement towards the object, a characteristic associated with the first floating icon is changed, the changed characteristic altering the displaying of the object as the first floating icon.

16. The method of claim 15, wherein characteristic associated with the first floating icon is changed in response to an occurrence of an alert in the application.

17. A non-transitory, machine-readable medium having instructions stored thereon, the instructions, when executed by a processor, cause a computing device to:
   execute a virtual reality (VR) application, the executing displaying first content on a screen of a VR headset;
   provide an object for display on the screen of the VR headset as a first floating icon by the VR application, the object being associated with an application configured to provide second content independent of the first content, the first floating icon being displayed along with the first content;
   detect a first movement of a user as movement towards the object, the first movement being rendered with the first content as the user delving into the first floating icon; and
   in response to detecting the first movement, execute the application, the executing combining the second content with the first content and providing the combined content for display on the screen of the VR headset by the VR application.

18. The medium of claim 17, wherein the computing device is included in the VR headset.

19. The medium of claim 17, wherein the instructions, when executed by the processor, further cause the computing device to:
   detect a second movement of the user as movement away from the object, the detecting occurring subsequent to detecting the first movement of the user as movement towards the object; and
   stop execution of the application in response to detecting the second movement.

20. The medium of claim 19,
   wherein the instructions, when executed by the processor, that cause the computing device to stop execution of the application include instructions that cause the computing device to provide the first content for display on the screen of the VR headset.

21. The medium of claim 17,
   wherein the instructions further include instructions, that when executed by the processor, further cause the computing device to detect a second movement of the user as continued movement towards the object, the second movement being rendered with the first content as
   the user further delving into the first floating icon; and
   wherein the instructions, when executed by the processor, that cause the computing device to execute the application further include instructions that cause the computing device to, in response to detecting the second movement, provide third content for display on the screen of the VR headset by the VR application, the third content providing further detailed information for the application than the second content.

22. The medium of claim 21, wherein the instructions, when executed by the processor, further cause the computing device to:
   receive an indication of an interaction by the user with an object included in the third content; and
   wherein the instructions, when executed by the processor, that cause the computing device to execute the application further include instructions that cause the computing device to provide the first content for display on the screen of the VR headset by the VR application in response to receiving the indication of the interaction.

23. The medium of claim 17, wherein combining the second content with the first content includes floating the second content over the first content.

24. A system comprising:
   a first computing device; and
   a virtual reality (VR) headset operatively coupled to the first computing device, the VR headset including a second computing device and a screen;
   the VR headset being configured to:
      display first content and an object as a first floating icon on the screen, the object being associated with an action, and a location on the screen of the displayed first floating icon being independent of the displayed first content;
      detect, by the second computing device, a first movement of a user as movement towards the object;
      provide, to the first computing device, an indication of the first movement of the user;
      display second content and the object as a second floating icon on the screen, a location on the screen of the displayed second floating icon being independent of the displayed second content;
      detect, by the second computing device, a second movement of the user as movement further towards the object subsequent to detecting the first movement;
      provide, to the first computing device, an indication of the second movement of the user subsequent to providing the indication of the first movement; and
      display third content; and
   the first computing device being configured to:
      execute a virtual reality (VR) application;
      provide the first content and the object as the first floating icon for display on the screen of the VR headset;
      receive the indication of the first movement of the user;
      in response to receiving the indication of the first movement:
         alter the first content for display on the screen of the VR headset as the second content; and
         provide the second content and the object as a second floating icon to the VR headset for display on the screen;
      receive the indication of the second movement of the user; and
      perform the associated action including providing third content to the VR headset for display on the screen in response to receiving the indication of the second movement.

25. The system of claim 24, wherein the first computing device and the second computing device are the same computing device being included in the VR headset.

26. The system of claim 24,
   wherein the associated action is the execution of an application, and wherein the third content includes content generated by the execution of the application.

27. The system of claim 24,
wherein the first floating icon is transparent, and
wherein the second floating icon is transparent.

* * * * *